(12) United States Patent
Chambers

(10) Patent No.: US 6,332,637 B1
(45) Date of Patent: Dec. 25, 2001

(54) COLLAPSIBLE CARGO SUPPORT SYSTEM

(76) Inventor: Marshall Robert Chambers, 9615 Fairbanks N. Houston Rd., Houston, TX (US) 77064

( * ) Notice: Subject to any disclaimer, the term of this patent is extended or adjusted under 35 U.S.C. 154(b) by 0 days.

(21) Appl. No.: 09/262,582

(22) Filed: Mar. 4, 1999

(51) Int. Cl.[7] .................................................. B60P 3/00
(52) U.S. Cl. ............................................. 296/3; 296/26.04
(58) Field of Search .............................. 296/3, 173, 159, 296/160, 25.09, 26.04; 224/549, 557

(56) References Cited

U.S. PATENT DOCUMENTS

| D. 244,268 | 5/1977 | Hinch . |
| D. 318,447 | 7/1991 | Haugen et al. . |
| 2,856,225 | 10/1958 | Selzer . |
| 2,993,727 | 6/1961 | Zewiske . |
| 3,365,230 | 1/1968 | Langdon . |
| 3,460,864 | 8/1969 | Piercy . |
| 3,891,262 | 6/1975 | Brunel . |
| 4,057,281 | 11/1977 | Garrett . |
| 4,152,020 | 5/1979 | Brown et al. . |
| 4,585,264 | 4/1986 | Miller . |
| 4,768,824 | * 9/1988 | Andonian ............................. 296/173 |
| 4,906,038 | 3/1990 | Morris . |
| 5,628,540 | 5/1997 | James . |
| 5,634,681 | 6/1997 | Gionta . |
| 5,658,033 | 8/1997 | Delaune . |
| 5,662,254 | 9/1997 | Lemajeur et al. . |
| 5,685,593 | 11/1997 | O'Connor . |
| 5,692,791 | 12/1997 | Sulzer . |
| 5,743,583 | * 4/1998 | Lowe ....................................... 296/3 |
| 6,068,134 | * 7/2000 | Cravens et al. ....................... 296/173 |
| 6,209,944 | * 4/2001 | Billiu et al. ...................... 296/100.02 |

* cited by examiner

*Primary Examiner*—Stephen T. Gordon
*Assistant Examiner*—Jason Morrow
(74) *Attorney, Agent, or Firm*—Mark R. Wisner

(57) ABSTRACT

A rack for securing cargo to a vehicle, the rack comprising: first and second base rails attached to the vehicle; first and second collapsible post having first and second hinge ends and first and second slide ends, wherein the first and second hinge ends are rotatably attached to the first base rail by first and second hinge joints, respectively; a first support rail slidably connected to the first and second slide ends of the first and second collapsible posts by first and second slide joints, respectively, whereby rotation of the first and second collapsible posts about the first and second hinge joints moves the first support rail between support and collapse positions; third and fourth collapsible post having third and fourth hinge ends and third and fourth slide ends, wherein the third and fourth hinge ends are rotatably attached to the second base rail by third and fourth hinge joints, respectively; a second support rail slidably connected to the third and fourth slide ends of the third and fourth collapsible posts by third and fourth slide joints, respectively, whereby rotation of the third and fourth collapsible posts about the third and fourth hinge joints moves the second support rail between support and collapse positions.

22 Claims, 23 Drawing Sheets

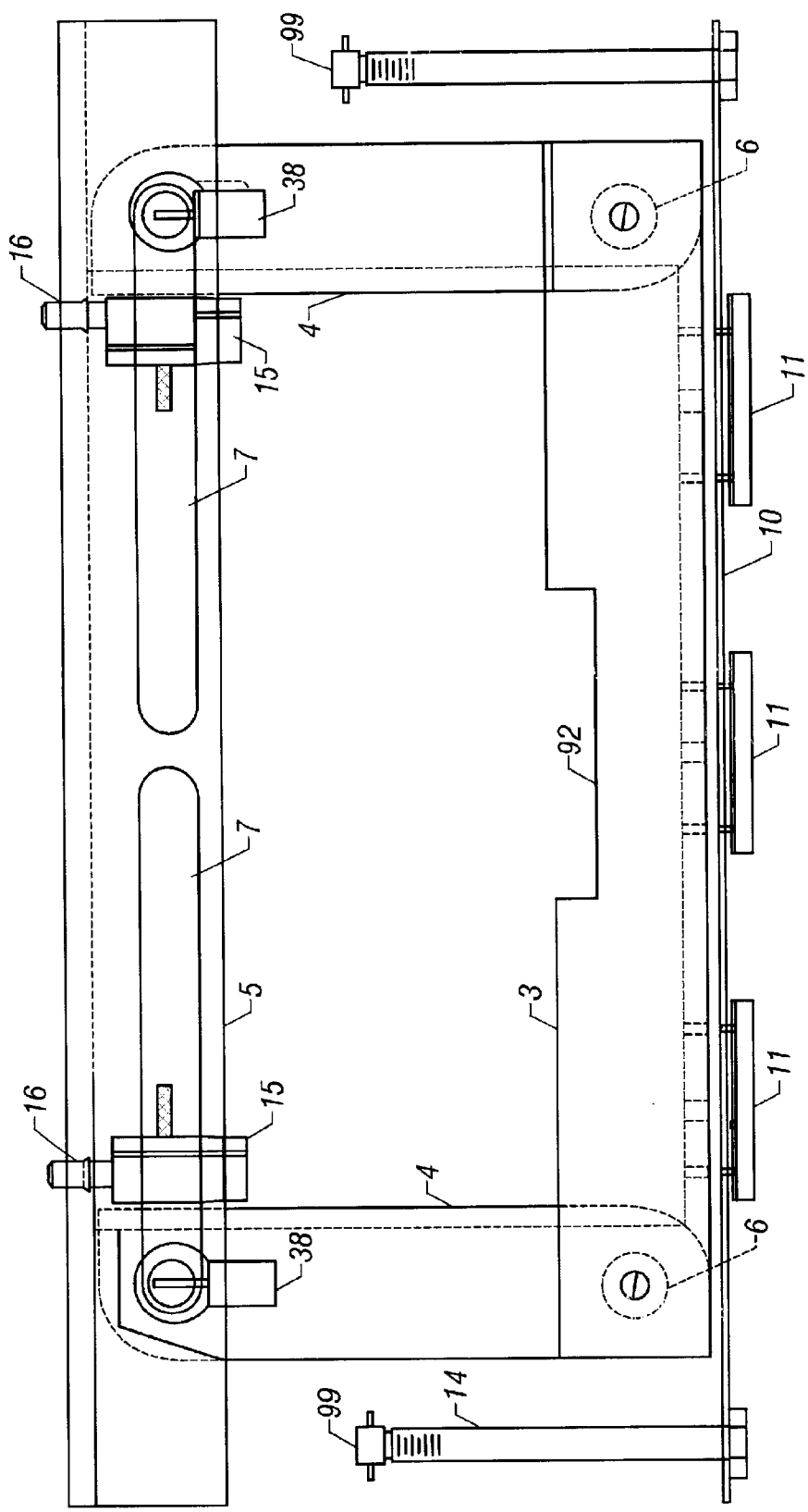

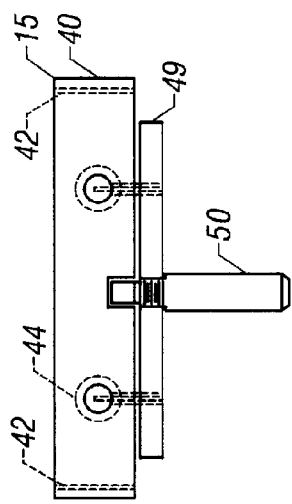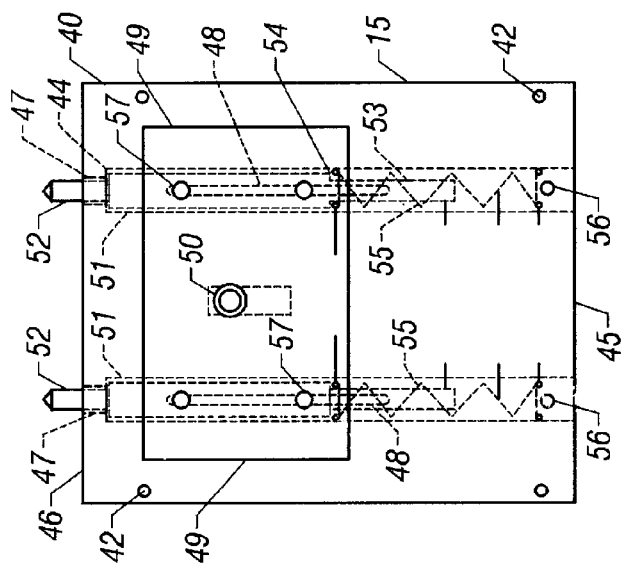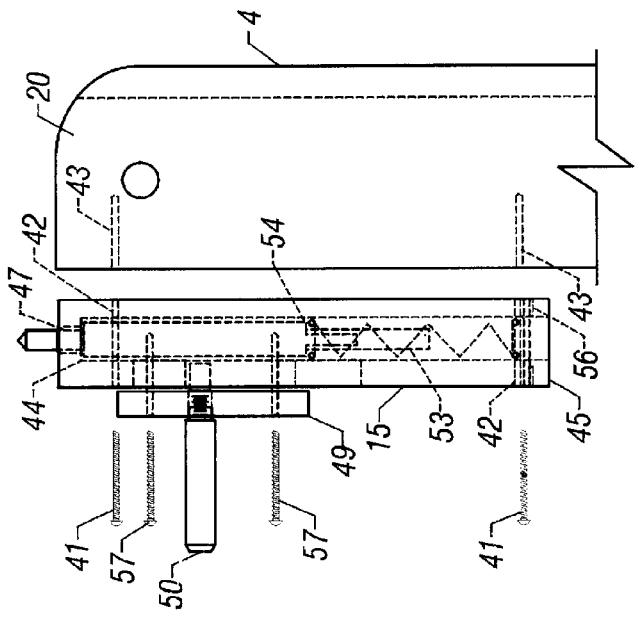

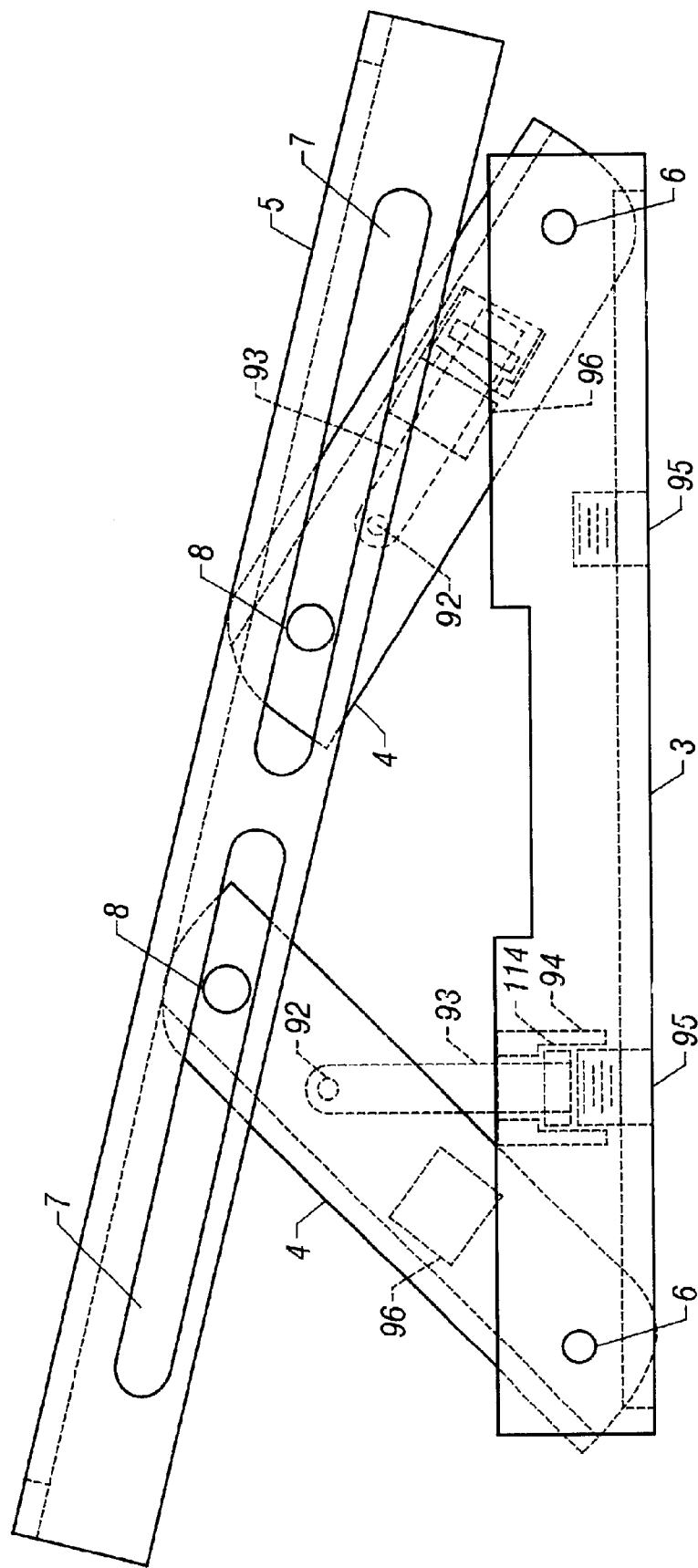

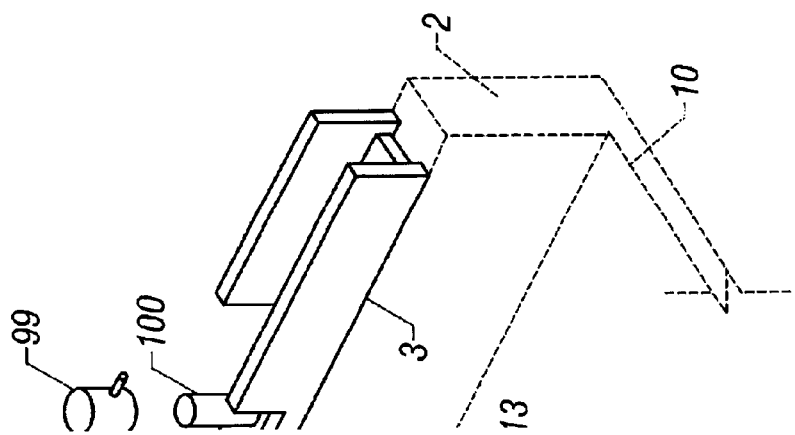
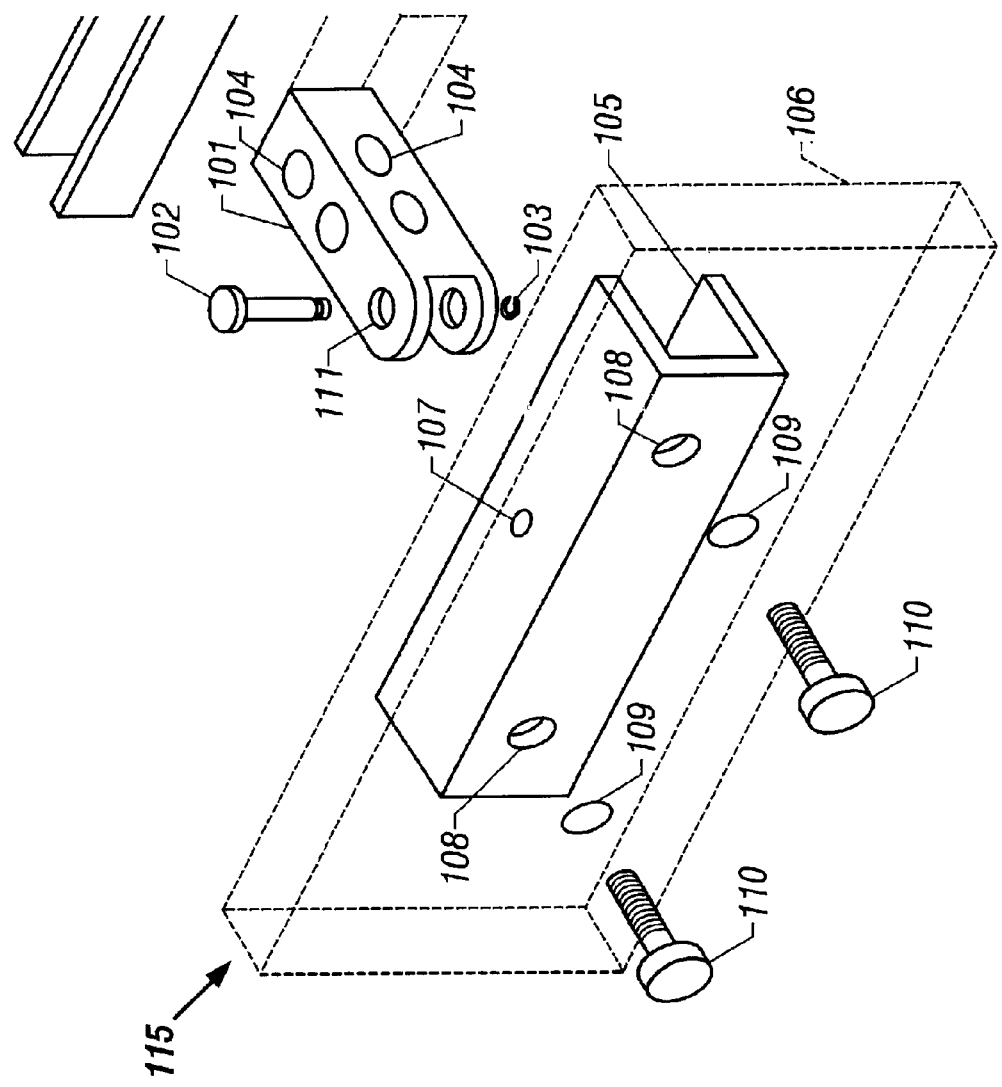
FIG. 18

COLLAPSIBLE CARGO SUPPORT SYSTEM

BACKGROUND OF THE INVENTION

The pickup truck has grown into an all-around, all-purpose vehicle for basic transportation; part-time truck, full-time work truck and recreational vehicle. In order to improve the cargo carrying function of pick-up trucks, various truck cargo racks have been proposed.

For example, as shown in U.S. Pat. No. 5,692,791, incorporated herein by reference. a rack for a bed of a pick-up truck is disclosed. The rack includes a plurality of vertical support poles for projecting within stake apertures within the sides of the bed of the pick-up truck. A pair of the elongated members removably secure the support poles to one another and a plurality of transverse members removably secure the pair of elongate members. A plurality of extended members secure orthogonally to each inner member projected downward and have a horizontal slot and an L-member removably projecting within the slot. Threaded shafts threadably engage the L-members substantially parallel to the support poles. Therefore, this device is comprised of several support rails and posts which are assembled to the pick-up truck to provide the cargo carrying function. However, if the rack is no longer desired, the entire rack must be disassembled and removed from the pick-up truck.

As shown in U.S. Des. Pat. No. 318,447, incorporated herein by reference, a pick-up truck rack comprising support rails which extend above the sides and front portions of a pick-up truck. The rack further comprises base rails for securing the cargo rack to the sides of the pick-up truck. The support rails and posts comprise one uniform cargo rack which may be secured to or removed from the pick-up truck.

A pick-up truck rack with means for facilitating loading, is shown in U.S. Pat. No. 4,152,020, incorporated herein by reference. The rack for a pick-up truck has four corner posts supported on steel angle bed rails which extend the full length of the truck box. The rails protect the top edges of the truck box. Corner posts are attached to the ends of the bed rails. Side rails extend between front and rear corner posts are lower than front and rear cross rails to facilitate loading, and the rear cross rail is removable to enable tall objects to be loaded onto the truck bed. When the cargo carrying function of the truck rack is no longer desirable, the entire truck rack must be disassembled and removed from the pick-up truck.

A pick-up truck rack is shown in U.S. Des. Pat. No. 244,268, incorporated herein by reference. The rack comprises four upside down U-shaped members which are bolted together at the vertical members of the U-shaped sections. The bolted together vertical members create posts which support the horizontal flat portions of the upside-down U-shaped members. Once assembled, the entire truck rack is bolted to a pick-up truck body to provide the cargo carrying function. Once this function is no longer desirable, the entire rack must be disassembled and removed from the pick-up truck.

Additionally, prior art pick-up truck rack systems have been disclosed which are collapsible to secure the rack out of the way when the cargo carrying function is no longer desired. This enables the rack to remain with the pick-up truck at all times so that the rack may be unfolded to its cargo carrying position when the cargo carrying function is desired.

For example, U.S. Pat. No. 4,906,038, incorporated herein by reference, discloses a livestock enclosure for a pick-up truck with two foldable rack structures. One foldable rack structure is provided for each sidewall of the truck body. These foldable rack structures terminate at the rear of the truck. The racks are collapsible against a vertical headboard at the front of the truck body. Blocking pins are provided to secure the rack to the wall of the truck. The rear gates may be swung open and if the truck is too close to a cattle chute or other structure, the gates may be opened by lateral movement. A bar holds the rack structure in position at the rear of the truck and also is employed to retain the rack in its collapsed position against the cab.

An alternative collapsible truck rack is described in U.S. Pat. No. 3,460,864, incorporated herein by reference. This collapsible truck rack includes: a series of sets of parallel bars, connected together by a parallel motion mechanism in the form of pivotable links and mounted in a series of vertical posts which are hinged so that in a collapsed condition the post folds longitudinally over the collapsed set of parallel bars.

In all of these prior art systems, when the cargo carrying function is no longer desirable, the rack must either be completely removed from the pick-up truck or collapsed to a position which does not allow full use of the pick-up truck without interference. In particular, the previously disclosed collapsible truck racks do not allow normal use of the pick-up truck when the racks are in their collapsed positions. Therefore, there is a need for a collapsible pick-up truck rack which collapses to a position which allows full use of the pick-up truck.

SUMMARY OF THE INVENTION

The cargo rack system of the present invention is installed on the body rail or rails of a pick-up truck to provide an eye pleasing functional accessory that folds and stores within itself when not in use and a strong rigid cargo rack that can be raised into a cargo carrying position within seconds, without hand tools.

According to one aspect of the invention, there is provided a rack for securing cargo to a vehicle, the rack comprising: a first base brace attached to the vehicle; a first collapsible post having a first hinge end and a first slide end, wherein the first hinge end is rotatably attached to the first base brace by a first hinge joint; and a first support rail connected to the first slide end of the first collapsible post by a first slide joint, whereby rotation of the first collapsible post about the first hinge joint moves the first support rail between support and collapse positions.

According to a further aspect of the invention, there is provided a rack for securing cargo to a vehicle, the rack comprising: first and second base rails attached to the vehicle; first and second collapsible post having first and second hinge ends and first and second slide ends, wherein the first and second hinge ends are rotatably attached to the first base rail by first and second hinge joints, respectively; a first support rail slidably connected to the first and second slide ends of the first and second collapsible posts by first and second slide joints, respectively, whereby rotation of the first and second collapsible posts about the first and second hinge joints moves the first support rail between support and collapse positions; third and fourth collapsible post having third and fourth hinge ends and third and fourth slide ends, wherein the third and fourth hinge ends are rotatably attached to the second base rail by third and fourth hinge joints, respectively; a second support rail slidably connected to the third and fourth slide ends of the third and fourth collapsible posts by third and fourth slide joints, respectively, whereby rotation of the third and fourth collapsible posts about the third and fourth hinge joints moves the second support rail between support and collapse positions.

A further aspect of the invention provides a method for carrying cargo in a vehicle, the method comprising: attaching a first base brace to the vehicle; rotating a first collapsible post, having a first hinge end and a first slide end, about a first hinge joint between the first base brace and the first hinge end of the first collapsible post; sliding the first slide end of the first collapsible post relative to a support rail through a first slide joint; locking the first slide joint in place relative to the support rail; attaching a second base brace to the vehicle; rotating a second collapsible post, having a second hinge end and a second slide end, about a second hinge joint between the second base brace and the second hinge end of the second collapsible post; sliding the second slide end of the second collapsible post relative to the support rail through a second slide joint; and locking the second slide joint in place relative to the support rail.

Several benefits flow from the device of the present invention. For example, cargo may be secured to one or both sides of the cargo rack with cargo straps that eliminate cargo damage and bind the cargo mass together to provide greater stability and resistance against centrifugal force exerted under adverse driving conditions.

Pick-up or flat bed truck types may be equipped with this invention to provide easy loading and use of the entire interior truck cargo space including that which extends over the cab, for long cartons, ladders, tubing, etc.

The system can be installed on either or both rails. Of course, greater utility is afforded with two racks. Further, cross beam members and a waterproof cover accessory to protect cargo during inclement weather conditions are also possible.

The system provides quick deploying with secure locking at all four corners in the cargo support position. One side of the cargo rack may be deployed to its cargo support position to support materials within the truck that will not stand unsupported during loading. When the cargo rack is locked in place and the cargo is securely bound to the cargo rack members, it creates a mass that will not blow out of the truck and will sustain centrifugal forces created in transit. Loading and unloading of cargo are facilitated by the ability to lower one side of the cargo rack and the tailgate for removal of part of the cargo and then quickly resecuring the remainder of the cargo when making multiple deliveries.

The cargo rack of the present invention may also be used to support a waterproof cover accessory to convert the pick-up truck into a recreational camper.

BRIEF DESCRIPTION OF THE DRAWINGS

The present invention is better understood by reading the following description of non-limitative embodiments with reference to the attached drawings wherein like parts in each of the several figures are identified by the same reference characters, and which are briefly described as follows.

FIG. 2A is a side view of a cargo rack embodiment of the invention in a support position.

FIG. 9A is a top view of a locking mechanism.

FIG. 9B is an end view of the locking mechanism shown in FIG. 9A.

FIG. 9C is an exploded side view of the locking mechanism shown in FIGS. 9A and 9B and a collapsible post.

FIG. 16A is a side view of an embodiment of the invention having swivel lock shafts for locking the rack in a partially extended, angled position.

FIG. 18 is an exploded perspective view of a cargo stabilizer.

DETAILED DESCRIPTION OF THE INVENTION

Figure 1:
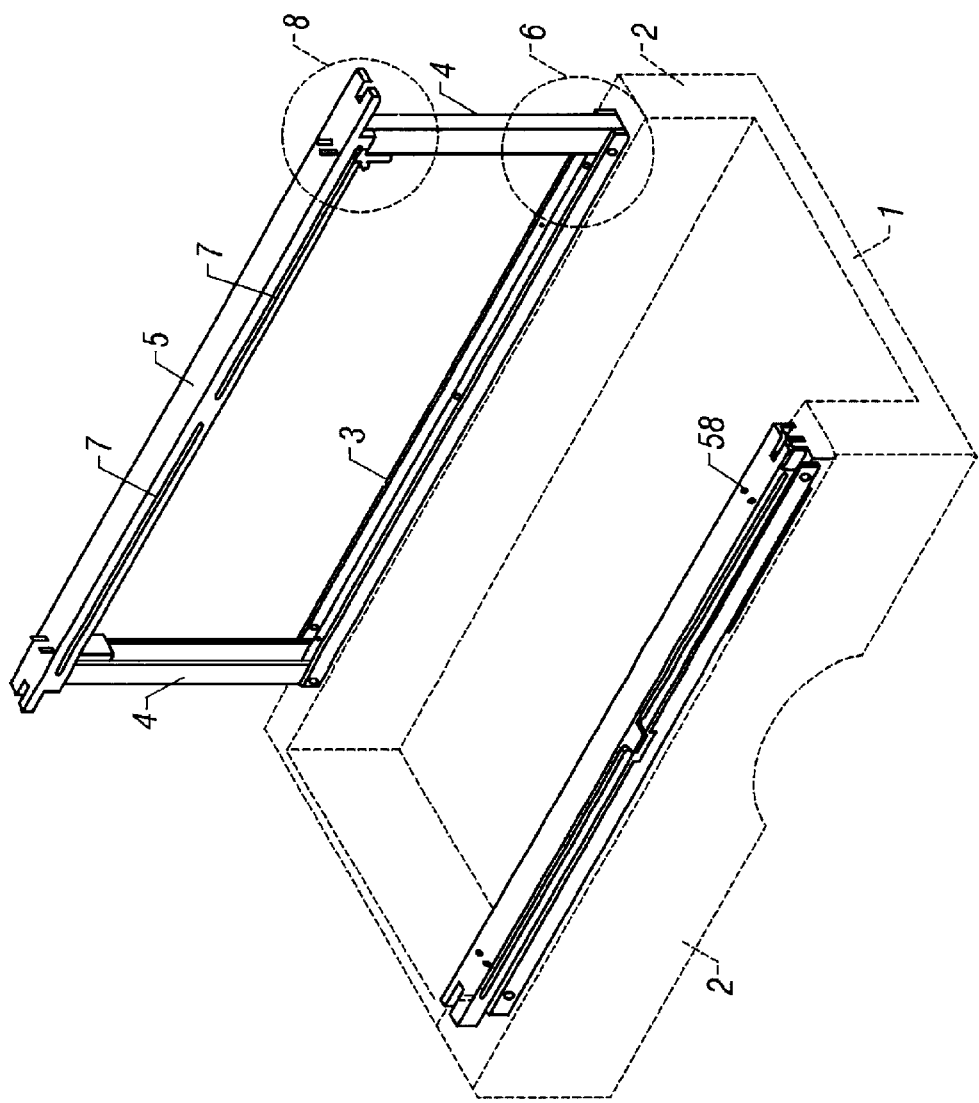
FIG. 1 is a perspective view of an embodiment of the invention shown relative to a truck body.

Referring to FIG. 1, a perspective view of one embodiment of the cargo rack of the present invention is shown. The illustrative embodiment has two side racks, one on each side 2 of a truck body 1. The side rack on the left side 2 is shown in a collapsed position, while the side rack on the right side 2 of the truck body 1 is shown in a support position. On top of the sides 2 of the ordinary truck body 1, a base rail 3 is attached. A base rail 3 extends from the front of the truck body 1 all the way to the end of the truck bed near the tail gate, not shown. A base rail 3 is attached to each of the truck body sides 2 so that the base rails 3 are positioned parallel to each other down opposite sides 2 of the truck body 1.

Near opposite ends of the base rail 3, each of the collapsible posts 4 are pivotally attached to the base rail 3 through pivotal joints 6. The collapsible posts 4 pivot relative to the base rail 3 through the pivotal joints 6 in the plane defined by the side 2 of the truck body 1. Opposite from the pivotal joints 6, the collapsible posts 4 are attached to a support rail 5 through a slide joint 8. The support rail 5 comprises carrier slots 7 which extend through an interior portion of the support rail 5 in the longitudinal direction. One carrier slot 7 is positioned at one side of the support rail 5 to receive one of the collapsible posts 4, while a second carrier slot 7 is positioned at the other side to receive the other collapsible post 4. Through the slidable joints 8, the collapsible posts 4 move relative to the support rail 5 to change the position of attachment of the collapsible posts 4 relative to the support rail 5.

As shown in FIG. 1, in the collapsed position, the support rail 5 rests directly on top of the base rail 3 with the two collapsible posts 4 between the support rail 5 and the base rail 3. The nonmovable pivotal joints are located at the ends of the base rail 3 where the collapsible posts 4 are attached to the base rail 3. Further, with the cargo rack in the collapsed position, the movable slide joints 8 rest in the slots 7 and are located near the middle of the support rail 5.

In preferred embodiments, the base rails, collapsible posts and support rails comprise extruded structural aluminum. Aluminum is lightweight and easily machinable with conventional machines. Laser machining is a preferred machining method. Aluminum may be anodized, painted or spray coated. The later provides the preferred finish because of its hardness, available colors and its ability to be repaired. Also, because aluminum is lightweight, the material makes the collapsible cargo carrier easier to deploy and collapse for manually deployed embodiments. In alternative embodiments, stainless steel is used for the base rails, collapsible posts and support rails. Stainless steel is a strong material with good finish, longevity and weathering characteristics. While stainless steel is heavier then aluminum, it is easy to machine and does not require additional finishing. Further, any material known to persons of skill may also be used.

Figure 2B:
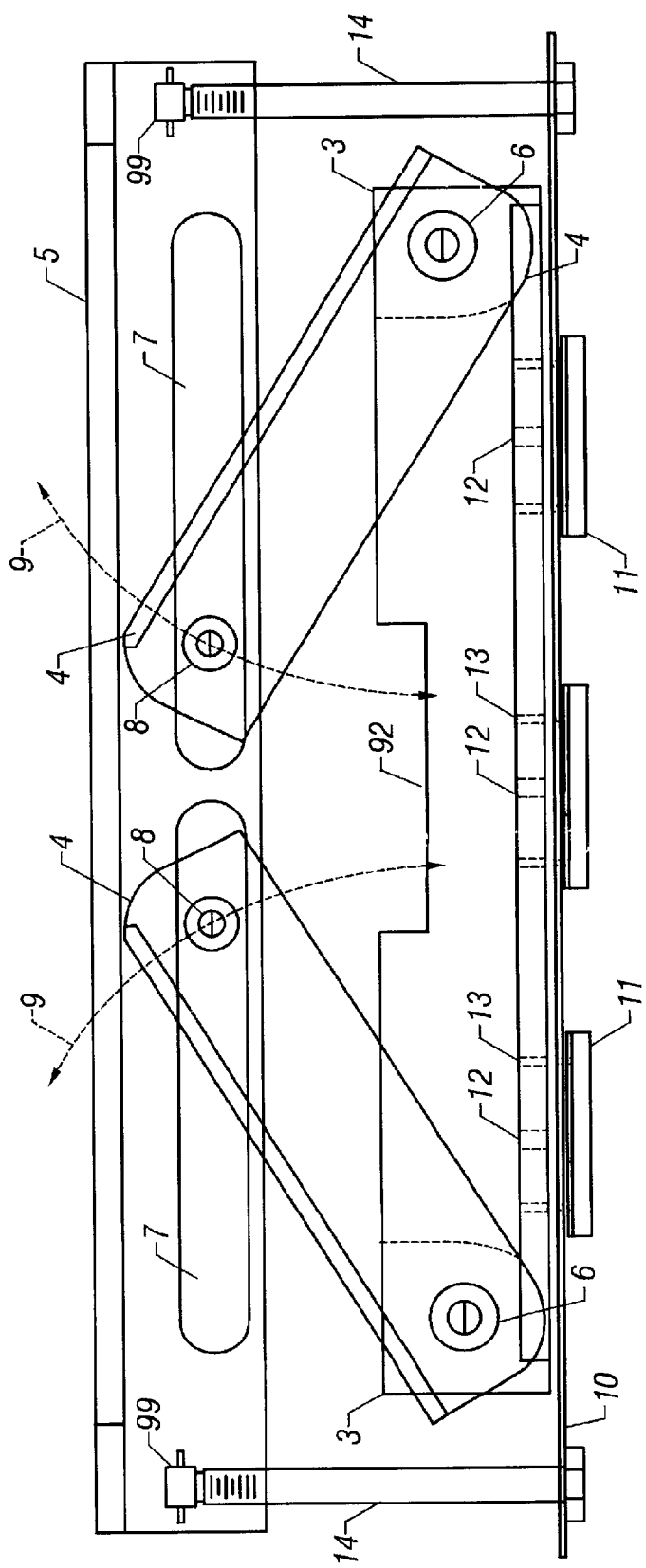
FIG. 2B is a side view of an embodiment of the invention in a partially collapsed position.
Figure 2C:
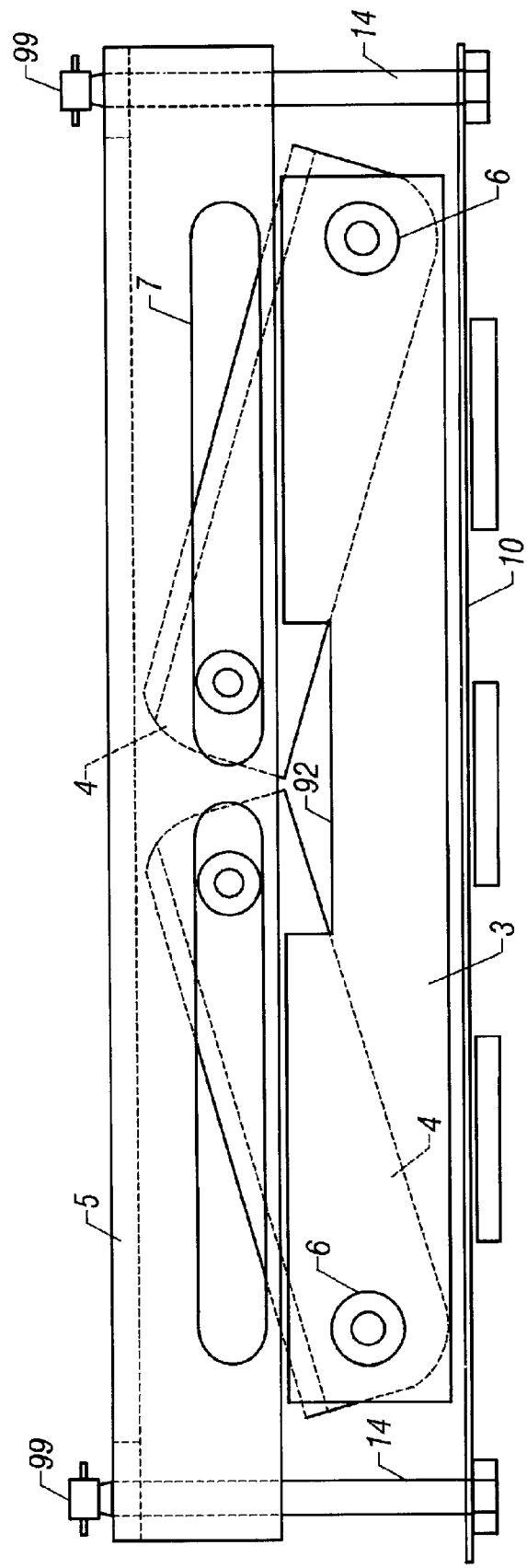
FIG. 2C is a side view of an embodiment of the invention in a fully collapsed position and locked down to the top surface of the truck body.

With reference to FIGS. 2A, 2B and 2C, movement of a side cargo rack from a collapsed position to a support position is illustrated. FIG. 2A shows a side view of the cargo rack with the collapsible posts 4 fully extended so that the rack is in a cargo carrying support position. FIG. 2B shows a side view of the cargo rack with the collapsible posts 4 partially extended so that the cargo rack is between the collapsed and support positions. FIG. 2C shows a side view of the cargo rack with the support rail 5 resting on the base rail 3 in a collapsed position. The base rail 3 comprises a rest slot 92 in an upper edge for receiving the slide joints 8 when the rack is in a closed position. As the cargo rack is moved from a collapsed position to a support position, the collapsible posts 4 rotate away from each other in the direction of arrows 9 (see FIG. 2B) about the pivotal joints 6 as the support rail 5 is raised vertically away from the base rail 3. Throughout this motion, the support rail 5 and the base rail 3 remain substantially parallel to each other. As these movements continue, the slide joints 8 move within the carrier slots 7 from positions near the middle of the support rail 5 to positions near the ends of the support rail 5. Once the support position is achieved, the support posts 4 form approximately right angles with the support rail 5 and the base rail 3. A lock mechanism 15 is attached to each of the collapsible posts 4 and engages lock holes 16 to lock the collapsible posts 4 in position relative to the support rail 5. The lock mechanism 15 is described in greater detail below with reference to FIGS. 9A through 9C.

As the cargo support system is collapsed from a support position to a collapsed position, the slide joints 8 move from positions near the ends toward the middle of the support rail 5. As the slide joints 8 move through the carrier slots 7 toward each other near the center of the support rail 5, the support rail 5 descends toward the base rail 3. During this collapsing motion, the support and base rails 5 and 3 remain parallel to each other. In its collapsed position, the support rail 5 rests on top of the base rail 3.

The cargo rack is flexible in that the front and back collapsible posts may be operated independent of each other. For example, if it is desireable only to provide a cargo rack for supporting cargo located in the front of the truck body, the front collapsible post may be extended to a support position. The back collapsible post remains in a collapsed position so that the support rail is in an inclined support position. Therefore, the cargo rack is conformable to the particular cargo to be supported.

The cargo support system may be firmly fixed in the collapsed position with tie down bolts 14. These tie down bolts 14 extend from the truck body surface 10 (or an angle frame 67 described below) upwardly toward and through to the support rail 5. Wing nuts 99 are affixed to the end of the tie down bolt 14 to securely attach the support rail 5 to the truck body surface 10. This configuration pulls the support rail 5 down on the base rail 3 to hold the entire cargo rack in the collapsed position. To raise the support rail 5 of the collapsible cargo support system, the tie down bolts 14 are removed by unscrewing the wing nuts 99 to free the support rail 5 from the truck body surface 10. In alternative embodiments, the support rail 5 is secured by any fastening means known in the art such as nylon straps, ropes, springs, fasteners, etc.

Still referring to FIGS. 2A and 2B, the base rail 3 is attached to an upper horizontal truck body surface 10 by support bars 11. The support bars 11 are placed within an interior of the side 2 of the truck body 1 so that the surface 10 is sandwiched between the support bars 11 and the base rail 3. Leveling screws 12 extend from the support bars 11 into the base rail 3. The leveling screws 12 are used to orient the positions of the base rail 3 and the support bars 11. Once the proper positions are obtained, the support bars 5 are securely fastened to the base rail 3 by anchor bolts 13.

In alternative embodiments, the base rail 3 of the cargo rack is not attached directly to the top surface 10 of a side 2 of the truck body 1. Since truck bodies differ in design, alternative methods of attachment are necessary. Early pick-up truck bodies are relatively consistent, without contoured inner sheaths to support the outer skin. There is considerable space between the rim of the upper rail and the outer skin on the inside of the truck body. The advent of the step-side type body and other sport designs with contoured inner sheaths provide many late model pick-up trucks with interference points between the inside of the truck body top surface 10 and the deck of the truck body 1. This is particularly true in the pocket areas at the ends of the truck bed.

Figure 3C:
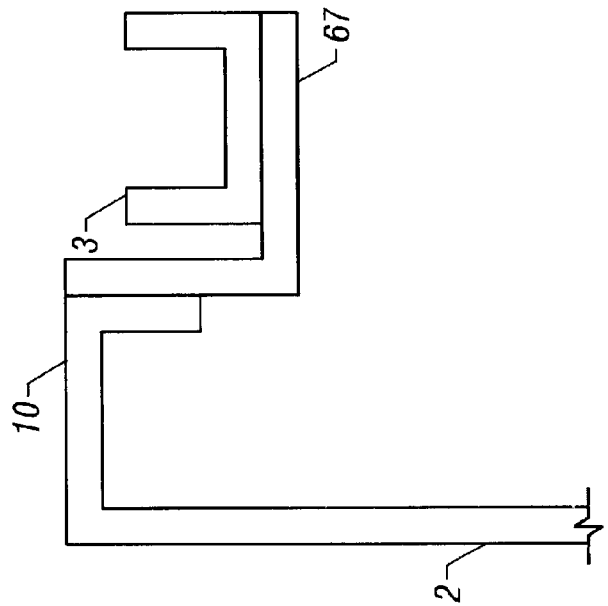
FIGS. 3, 3B and 3C are end views of alternative embodiments for attaching the base rail of the cargo rack to a side of a truck body.
Figure 3B:
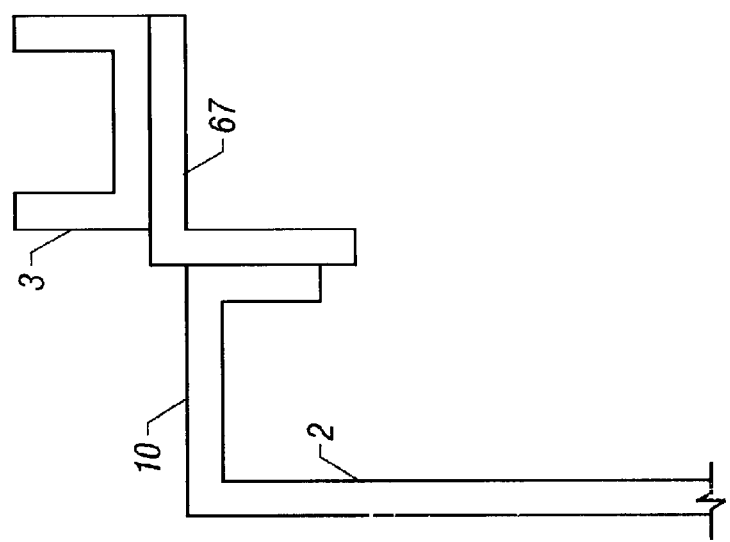
Figure 3A:
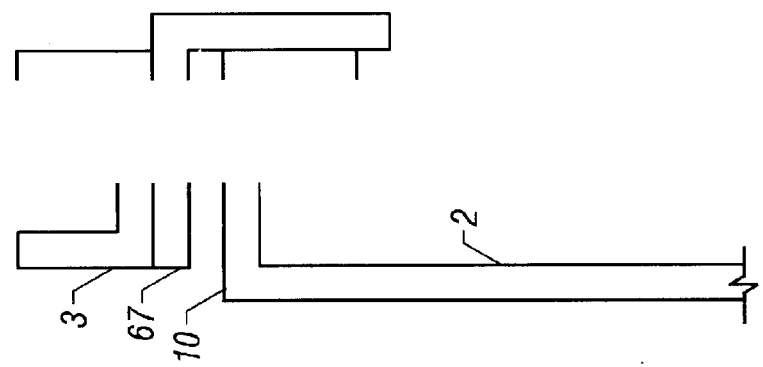

Alternative embodiments for attaching the base rail 3 to the truck body 1 are described with reference to FIGS. 3–3C. In FIG. 3 an angle frame 67 is attached to a vertical interior surface of the truck body side 2 so that the angle frame 67 extends up and over the truck body top surface 10. The base rail 3 is then attached to a horizontal portion of the angle frame 67 in a manner similar to that described above for attaching the base rail 3 directly to the truck body top surface 10. As shown in FIG. 3B, a vertical portion of the angle frame 67 is attached to a vertical interior surface of the truck body side 2 so that a horizontal portion of the angle frame 67 extends toward the middle of the truck body 1 away from the truck body side 2. The angle frame 67 is positioned so the horizontal portion is above the vertical portion. The base rail 3 is attached to the horizontal portion of the angle frame 67. This allows the base rail 3 to be attached at a height equal to or greater than the height of the truck body top surface 10. In FIG. 3C an embodiment is shown similar to that shown in FIG. 3B. A vertical portion of the angle frame 67 is attached to a vertical interior surface of the truck body side 2 as before, except in this embodiment, the horizontal portion of the angle frame 67 is positioned below the vertical portion. The base rail 3 is attached to the horizontal portion of the angle frame 67. In this embodiment, the base rail 3 is mounted below the height of the truck body top surface 10. In all embodiments, the angle frame 67 is attached to the truck body side 2 with screws, rivets, cement and all other fastening devices known to persons of skill in the art. Depending on the particular embodiment, the angle frame 67 is made of aluminum, stainless steel or any other suitable material known to persons of skill.

Figure 4B:
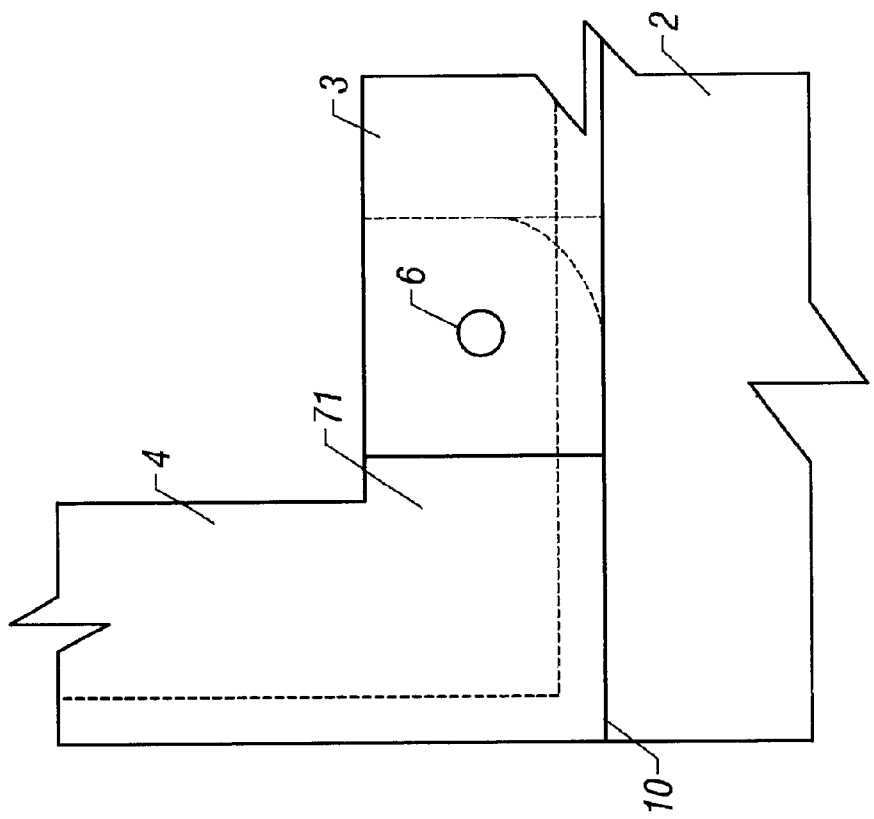
FIG. 4B is a side view of the pivotal joint of the cargo rack shown in FIG. 4A having a post offset, wherein the collapsible post is shown in a support position.
Figure 4A:
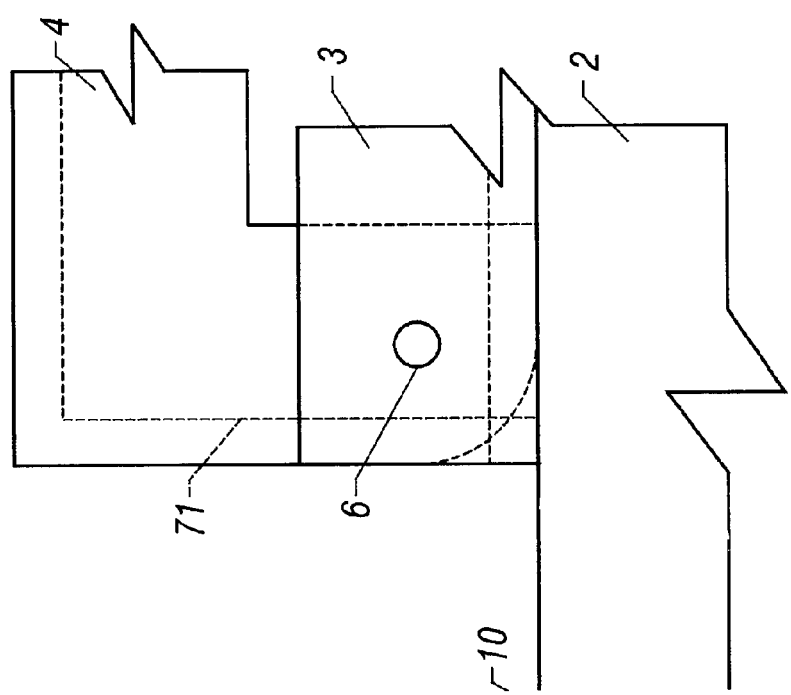
FIG. 4A is a side view of a pivotal joint of a cargo rack having a post offset, wherein the collapsible post is shown in a collapsed position.

With the collapsible posts 4 positioned in the corners of the truck body 1, the cargo rack provides improved stability and further serves as a structure over which a raincoat may be attached in a water tight manner. The raincoat will be discussed more fully below. However, as noted above, some truck body configurations do not allow the base rail 3 to extend the full length of the truck body 1. As shown in FIG. 4A and 4B, an embodiment of the invention is shown which comprises a post offset 71. The post offset 71 is a section of post set at a right angle to the main section of the collapsible post 4. The post offset extends between the main section of the collapsible post 4 and the pivotal joint 6. In FIG. 4A the cargo rack is shown in a collapsed position so that the collapsible post 4 is folded over the base rail 3. The base rail 3 does not extend to the end of the truck body side 2. In this collapsed position the post offset 71 is oriented vertically between the pivotal joint 6 and the collapsible post 4. In FIG. 4B the cargo rack is shown in a support position with the collapsible post 4 vertically oriented. The post offset 71 is parallel with the base rail 3 and rests on top of the top truck body surface 10. This embodiment of the invention enables the corner stake hole found in the corners of most truck bodies to be exposed while the cargo rack is in a collapsed position, but still enables the collapsible post to be positioned directly over the corner of the truck body 1 when the cargo rack is in a support position. Of course, this applies to embodiments of the invention where the base rails 3 are attached directly to a truck body surface 10 or an angle frame 67 as shown in FIG. 3.

Figure 5A:
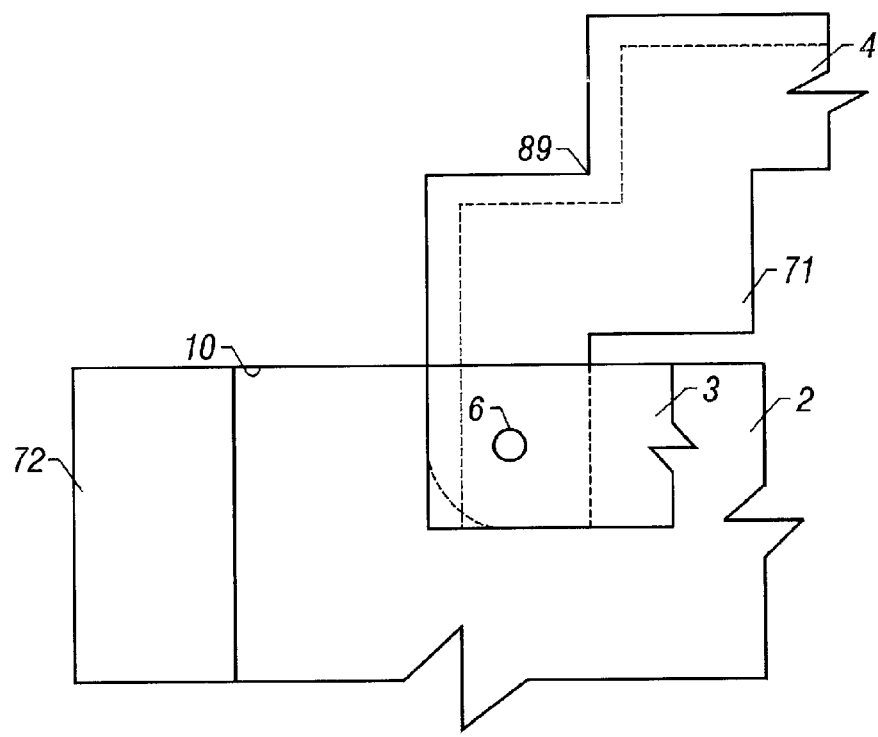
FIG. 5A is a side view of a pivotal joint of a cargo rack wherein the base rail is attached below a height of the top surface of the truck body side, and wherein a post offset comprises a notch. The collapsible post is shown in a collapsed position.
Figure 5B:
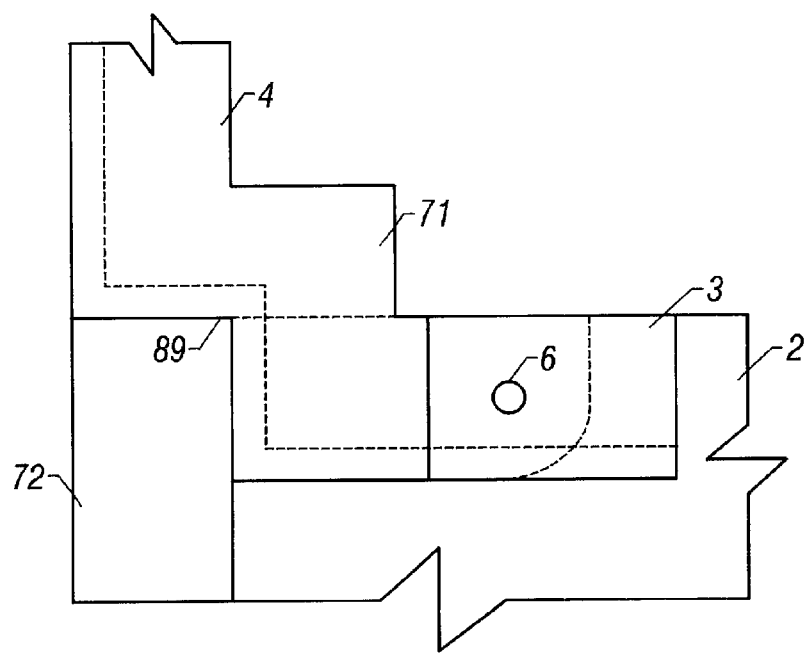
FIG. 5B shows a side view of the pivotal joint shown in FIG. 5B, wherein collapsible post is in a support position.

Other truck body configurations require the base rail 3 to be attached below the height of the truck body side top surface 10 as shown in FIG. 3C. As shown in FIGS. 5A and 5B, an offset 71 facilitates placement of the collapsible post 4 over the truck body front 72. In FIG. 5A, the collapsible post 4 is folded over the base rail 3 so that the cargo rack is in a collapsed position. The post offset 71 extends between the pivotal joint 6 and the collapsible post 4. From the pivotal joint 6, the post offset 71 extends vertically, horizontally and then vertically to connect with the collapsible post 4. The bends in the post offset 71 form a post notch 89. As shown in FIG. 5B, the post notch 89 enables the post offset to rest firmly on the truck body front 72 when the cargo rack is in a support position.

Figure 6:
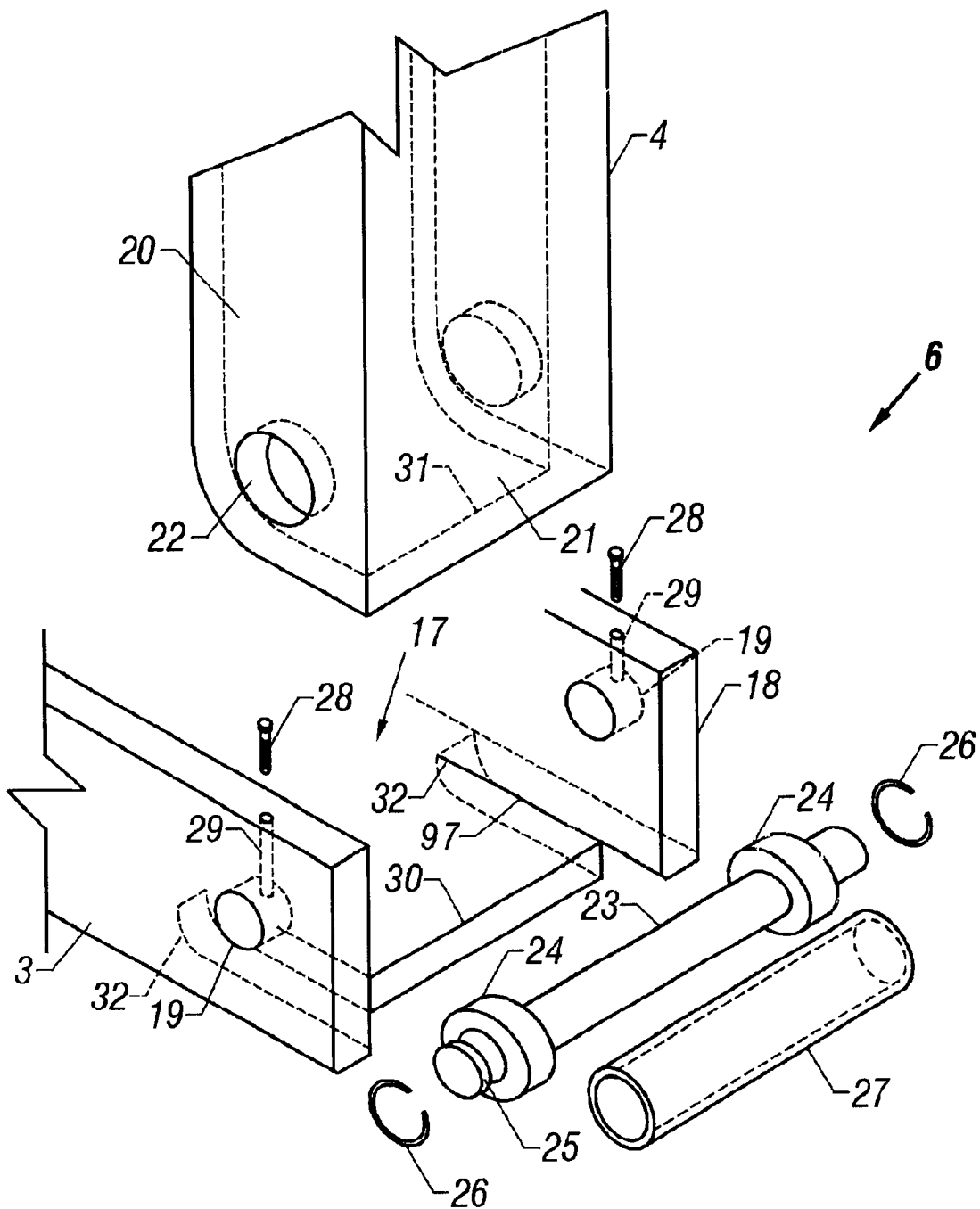
FIG. 6 is an exploded view of a pivotal joint between a base rail and a collapsible post.

Referring now to FIG. 6, the pivotal joint 6 for attaching a collapsible post 4 to the base rail 3 is shown. While only the pivotal joint 6 for the right collapsible post 4 is shown, it is to be understood that a similar pivotal joint 6 is also used for the left collapsible post 4. The base rail 3 is a channel configuration with a base rail bottom 17 and two base rail sides 18. In each of the sides 18, an axle shaft bore 19 is cut. Similarly, the collapsible post 4 is a channel member having support sides 20 and a transverse support portion 21. The collapsible post 4 further comprises anchor holes 22 cut through the support sides 20. The pivotal joint 6 is made by positioning the collapsible post 4 within the channel shaped base rail 3 so that the axle shaft bores 19 are aligned with the anchor holes 22. Once aligned, a hinge shaft 23 is inserted into the holes 22 and bores 19.

In a preferred embodiment, hinge bearings 24 are inserted into the anchor holes 22 to improve the function of the pivotal joint 6. At each end of the hinge shaft 23, a ring groove 25 is cut to receive snap ring 26. This embodiment of the invention is assembled by pressing the hinge bearings 24 in the anchor holes 22 prior to positioning the collapsible post 3 within the sides 18 of the base rail 3. Next, a first snap ring 26 is placed in a ring groove 25 of the hinge shaft 23. Then, with the anchor holes 22 and the axle shaft bores 19 aligned, the end of the hinge shaft 23, without a snap ring 26, is inserted through a first axle shaft bore 19 and into the center of a first hinge bearing 24 which resides within a first anchor hole 22. Before the end of the hinge shaft 23 is allowed to extend beyond the first hinge bearing 24 into an area between the two hinge bearings 24, a hinge bearing spacer 27 is positioned between the hinge bearings 24. With the hinge bearing spacer 27 in position, the hinge shaft 23 is fully inserted through the hinge bearing spacer 27, the second hinge bearing 24, and the second axle shaft bore 19. Once the hinge shaft 23 is inserted to the point where the first assembled snap ring 26 rests against the side 18 of the base rail 3, a second snap ring 26 is placed in the second exposed ring groove 25 in the hinge shaft 23. To prevent the hinge shaft 23 from rotating in the axle shaft bores 19, set screws 28 are inserted through screw holes 29 to engage the hinge shaft 23.

To stabilize the collapsible post 4 when it rotates into a vertical position, a vertical hinge stop 31 is located at the bottom edge of the collapsible post 4 for resting against a base hinge stop 30. Basically, these hinge stops comprise the transverse sections of the channel shaped base rail 3 and support post 4. Further, the base rail 3 comprises buttress slots 32 which are cut in the base rail bottom 17 near the sides 18 of the channel shaped base rail 3. As the collapsible post 4 is rotated from a collapsed horizontal position into an extended vertical position, the support sides 20 of the collapsible post 4 slide into the buttress slots 32. Of course, the buttress slots 32 are only slightly wider than the support sides 20. In a preferred embodiment, the rail edges 97 are chamfered to provide a smooth transition of the support sides 20 into the buttress slots 32.

Figure 7:
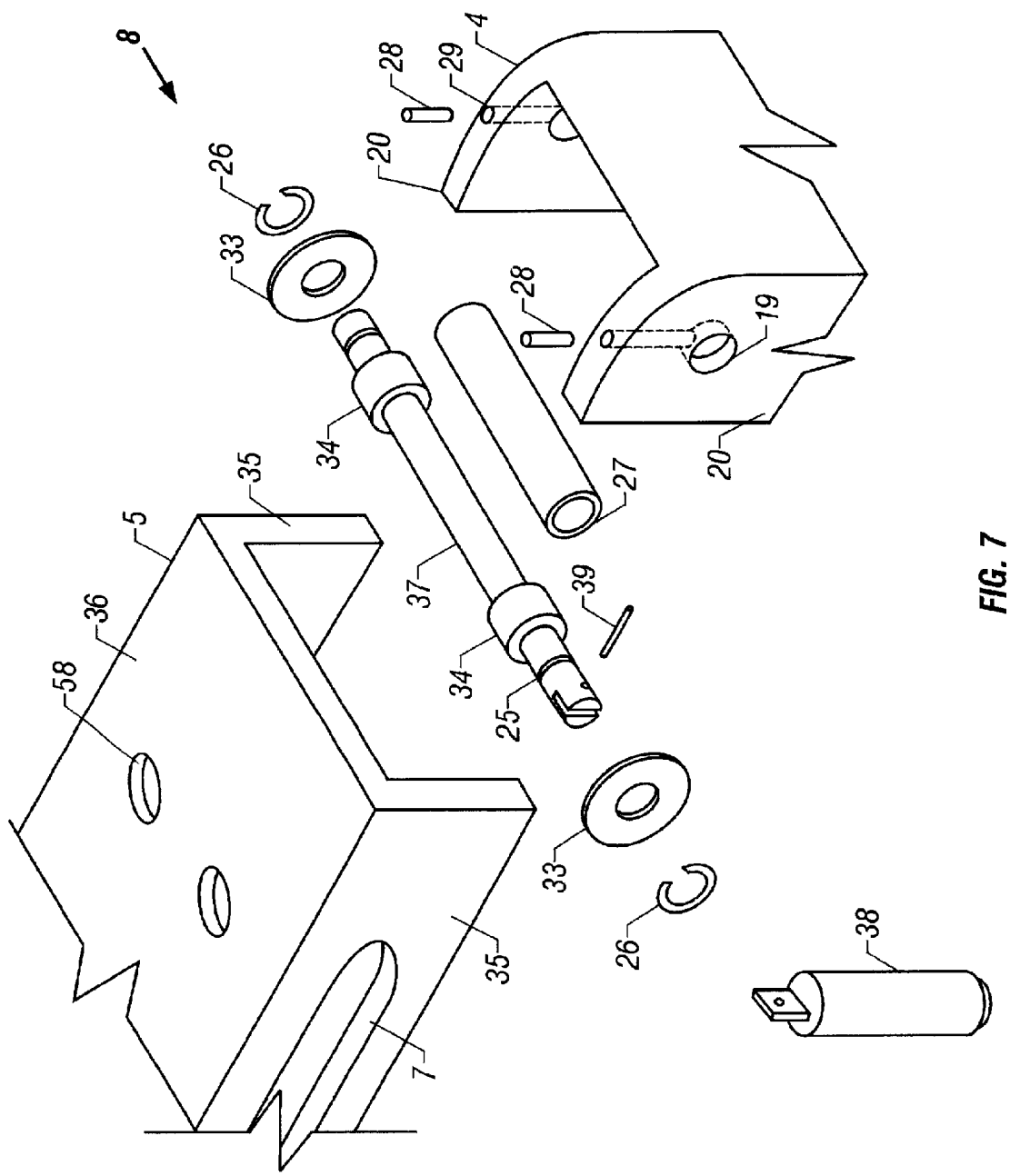
FIG. 7 is an exploded view of a slide joint between a collapsible post is and a support rail.

Referring to FIG. 7, an embodiment of the slide joint 8 between the collapsible post 4 and the support rail 5 is shown in an exploded view. The support rail 5 is a channel shaped member with support rail sides 35 connected by a support rail top 36. Carrier slots 7 are cut in the longitudinal direction in both of the support rail sides 35. The slide joint 8 is made by snapping a first snap ring 26 into a first ring groove 25 in the joint shaft 37. With the first snap ring 26 in position, a bearing retainer 33 is slipped over a second end of the joint shaft 37 opposite from the first snap ring 26. The bearing retainer 33 is slid all the way across the joint shaft 37 until it rests firmly against the first snap ring 26. With the first bearing retainer 33 in position, a first joint bearing 34 is slipped over the second end of the joint shaft 37 and slid all the way across the shaft 37 until it rests firmly against the assembled bearing retainer 33. Next, with shaft bores 19 drilled in the sides 20 of the collapsible post 4, the collapsible post 4 is positioned between the support rail sides 35 of the support rail 5. In particular, the collapsible post 4 is positioned so that the shaft bores 19 in the collapsible post 4 are aligned with the carrier slots 7 in the support rail 5. The joint shaft 37, with its assembled snap ring 26, bearing retainer 33 and joint bearing 34, is inserted through a first carrier slot 7, through both shaft bores 19 and through the second carrier slot 7. In this embodiment, the diameters of the shaft bores 19 are only slightly larger than the diameter of the joint shaft 37. Also, the outside diameters of the joint bearings 34 are only slightly smaller than the inside diameters of the carrier slots 7. With these dimensions, the joint shaft 37 is fully inserted through both shaft bores 19 so that the assembled first joint bearing 34 is received within the first carrier slot 7 and the assembled first bearing retainer 33 fits flatly against the side 35 of the support rail 5.

The second side of the slide joint 8 is completed by slipping a second joint bearing 34 over the second end of the joint shaft 37 until it fits within the second carrier slot 7 of the support rail 5 and against the support side 20 of the collapsible post 4. Next, the second bearing retainer 33 is slipped over the second end of the joint shaft 37 until it is flat against the support rail side 35 of the support rail 5. The second snap ring 26 is then inserted into the second ring groove 25. Finally, to keep the joint shaft 37 from rotating within the axle shaft bores 19, set screws 28 are screwed into set screw holes 29 to engage the joint shaft 37.

In an alternative embodiment of the slide joint 8, the diameters of the carrier slot 7 are only slightly larger than the outside diameter of the joint shaft 37. Further, the inside diameters of the axle shaft bores 19 are slightly larger than the outside diameters of the joint bearings 34. Therefore, in this embodiment the bearings 34 reside inside the shaft bores 19 and the ends of the joint shaft 37 slide in the carrier slot 7. This embodiment further comprises a bearing spacer 27 which is inserted around the joint shaft 37 between the joint bearings 34. The remaining parts of the slide joint 8 are assembled as noted above with the previously described embodiment.

In both of these embodiments, the slide joint 8 further comprises a handle 38 which is attached to an end of a joint shaft 37 by a hinge pin 39. The handle 38 enables a user of the cargo rack to manually operate the slide joint 8 to move the cargo rack from a collapsed position to a support position.

Figure 8:
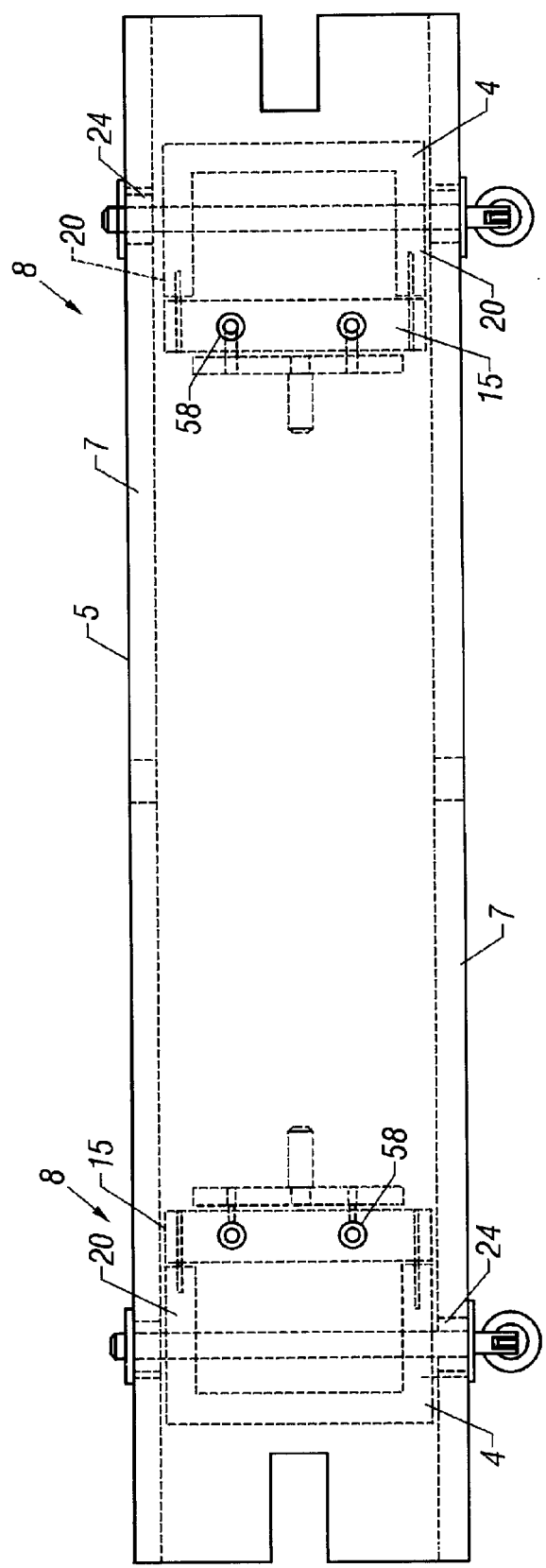
FIG. 8 is a top view of a support rail, two collapsible posts, two slide joints, and two locking mechanisms which lock the slide joints in place relative to the support rail.

Referring to FIG. 8, a top view of a support rail 5 and two assembled slide joints 8 are shown. In this embodiment, the joint bearings 34 are positioned within the carrier slot 7. Further, locking mechanisms 15 are attached to the edges of the support sides 20 of the collapsible post 4. Locking mechanisms are discussed more fully below.

Referring to FIGS. 9A, 9B and 9C, top, end and side views of the locking mechanism 15 are shown. The purpose of the lock mechanism 15 is to form a positive connection between the collapsible post 4 and the support rail 5. The locking mechanism 15 minimizes movement between the collapsible post 4 and the support rail 5 to form a rigid structure that will withstand forces created under transit load conditions.

The locking mechanism 15 comprises a lock body 40 which is attached to the support sides 20 of the collapsible post 4 by lock body screws 41. Lock body screws 41 extend through the lock body holes 42 and into threaded holes 43 in the support sides 20 of the collapsible post 4. In a direction parallel to the collapsible post 4, the lock body 40 comprises two shafts 44. The shafts 44 are of constant diameter from the bottom 45 of the lock body 40 to almost the top 46. Near the tops of the shafts 44, the diameters reduce in size to form shaft flanges 47. The lock body 40 also comprises slots 48 which are cut in the flat end face of the lock body 40 which is opposite from the flat end face which lays flat against the support sides 20 of the collapsible post 4. These slots 48 extend from the shafts 44 to the exterior of the lock body 40 to provide access to the shafts 44.

The lock body 40 comprises a slide plate 49 which is positioned adjacent to the flat end face of the lock body 40 over the slots 48. A lock handle 50 is screwed into the slide plate 40 at a central location. The lock mechanism 15 further comprises two lock rods 51 which are positioned within the shafts 44. The lock rods 51 each have a central portion with an outside diameter slightly smaller than the inside diameters of the shafts 44. Each of the lock rods 51 have a cone shaped end 52, the diameters of which are slightly smaller than the inside diameter of the shaft flange 47. This enables the cone shaped end 52 to extend through the shaft flange 47 and out through the top 46 of the lock body 40. Each of the lock rods 51 also have at the bottom end a spring slide portion 53 which has an outside diameter smaller than that of the central portion of the lock rod 51. Therefore, a spring flange 54 is formed between the central portion of the lock rod 51 and the spring slide portion 53. Finally, the lock mechanism 15 comprises bias springs 55 which are inserted onto the shafts 44.

The lock mechanism 15 is assembled by inserting the lock rods 51 into the shafts 44 from the bottom 45 of the lock body 40. Once the lock rods 51 are inserted until the cone shaped ends 52 extend through the shaft flange 47, the bias springs 15 are then inserted onto the shafts 44 at the bottom 45 of the lock body 40. The bias springs 55 are locked onto the shafts 44 by spring pins 56 which are inserted through holes in the lock body 40. The slide plate 49 is attached to the lock rods 41 by slide screws 57. The slide screws 57 extend through the slide plate 49, through slots 48 and into the lock rods 51.

Referring again to FIGS. 7, 8, 9A, 9B and 9C, the slide joint 8 is locked relative to the support rail 5 when the cargo rack is in the support position by extending the cone shaped ends 52 of the lock rods 51 into lock holes 58.

Depending on the particular embodiment of the invention, the cargo rack may be moved between support and collapse positions either manually or automatically. To manually operate the cargo rack, a user of the rack simply pushes the handles 38 (see FIG. 7) to slide the slide joints 8 through the carrier slots 7. The collapsible posts 4 extend and the slide joints move from the center of the support rail 5 toward the ends. The user continues to push the handles 38 Is until the slide joints are locked by the lock mechanisms 15 at the ends of the support rail 5. Of course easier manual operation consists of only pushing upward and outward on one handle 38 at a time. Once one collapsible post 4 is fully extended and the slide joint 8 locked in position by the lock mechanism 15, the opposite handle 38 is pushed by the user to move the opposite collapsible post 4 into position.

Figure 10:
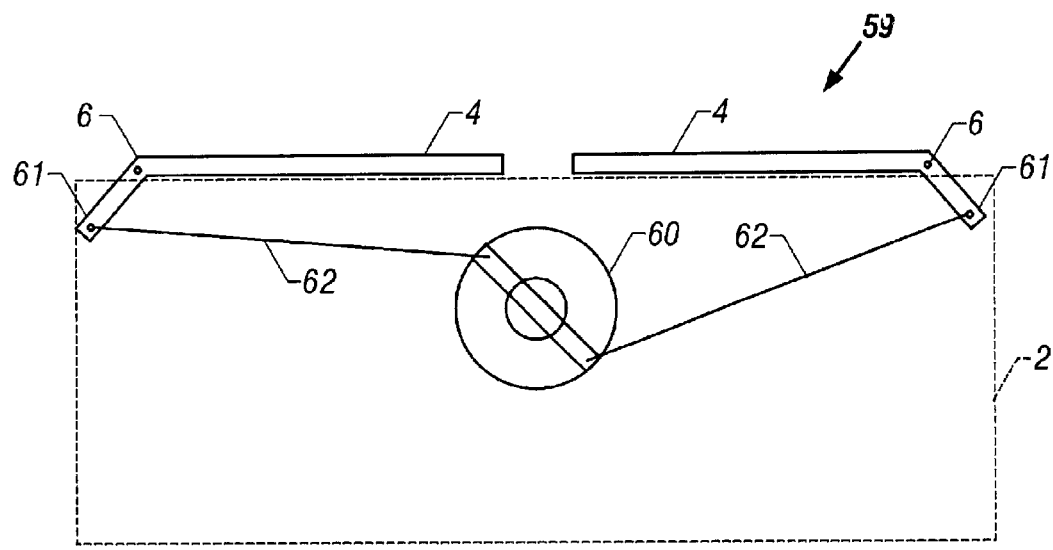
FIG. 10 is a side view of a collapse/extend device which moves the cargo rack from a collapsed position to a support position. The embodiment of the device shown is a drive wheel and tension line or shaft set up.

Referring to FIG. 10, an automatic collapse/extend device 59 is illustrated. In this embodiment, the collapse/extend device 59 comprises a drive wheel 60 which is located within a truck body side 2. Collapsible posts 4 are positioned on top of the truck body side 2 as previously described. Lever 61 is connected to the collapsible posts 4 for rotating the collapsible posts 4 about pivotable joint 6. The levers 61 are connected to the drive wheel 60 by tension line 62. The collapse/extend device 59 operates to extend the collapsible posts 4 by rotating the drive wheel 60. As the drive wheel 60 rotates, tension line 62 are pulled toward the drive wheel 60. As the tension lines 62 are pulled, the levers 61 are also pulled toward the drive wheel 60 to rotate the collapsible post 4 about the pivotal joint 6. Depending on the particular embodiment, the tension lines 62 may be cables which are adjusted with a turnbuckle to maintain tension and compensate for stretching, or they may be stiff shafts, tubes, or rods.

Figure 11:
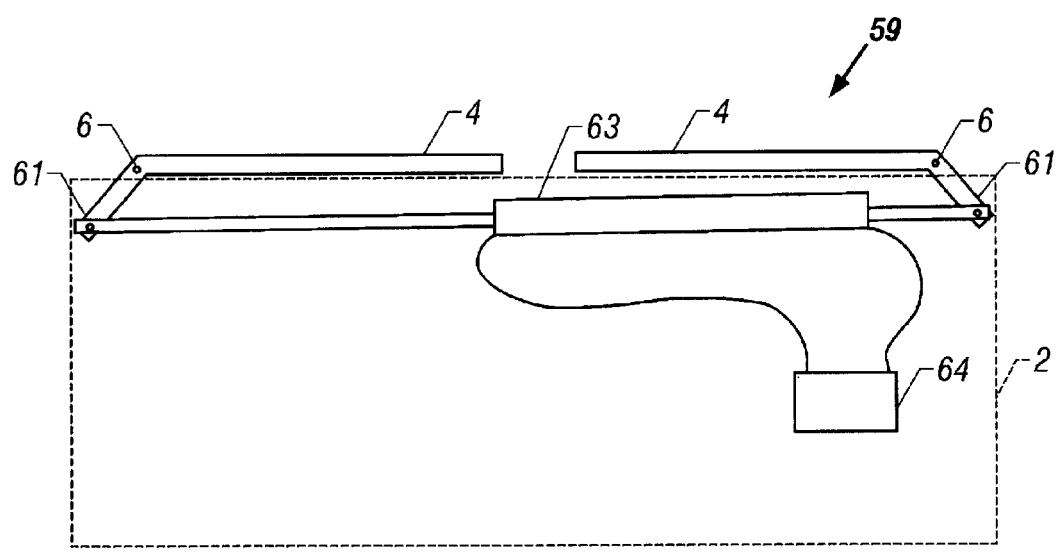
FIG. 11 is a side view of an embodiment of a collapse/extend device having a piston driven by a pump.

Referring to FIG. 11, an alternative embodiment for a collapse/extend device 59 is illustrated. In this embodiment, levers 61 are attached to a piston 63 which is powered by a pump 64. When the pump 64 drives the piston 63, the levers 61 are pulled toward each other to rotate the collapsible posts 4 about the pivotal joint 6. In this manner, the cargo rack (not shown) of the present invention may be moved from a collapsed position to a support position. Similarly, the piston may also be operated to move the levers 61 away from each other. This operation is done to move the cargo rack (not shown) from a support position to a collapsed position. As the levers 61 are moved away from each other, collapsible posts 4 rotate toward each other about the pivotal joint 6 to rest on top of the truck body side 2.

Figure 12B:
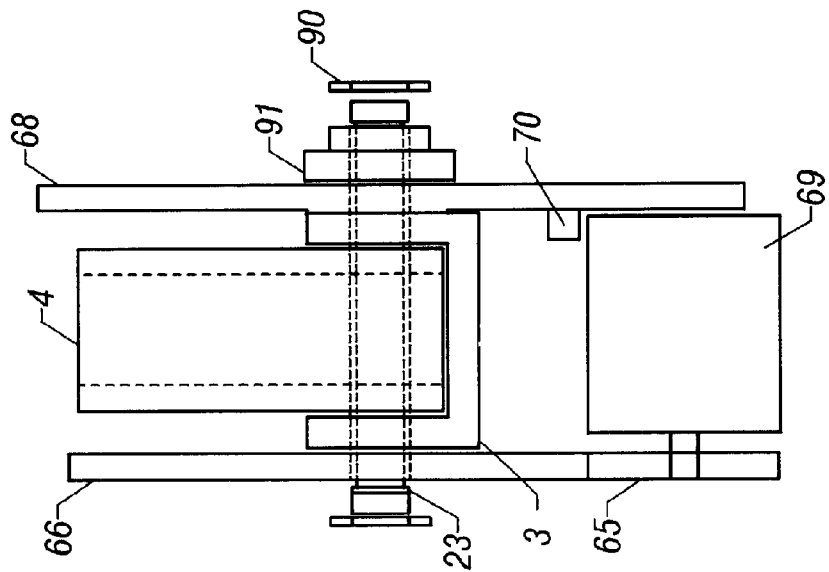
FIG. 12B is an end view of the collapse/extend device shown in FIG. 12A.
Figure 12A:
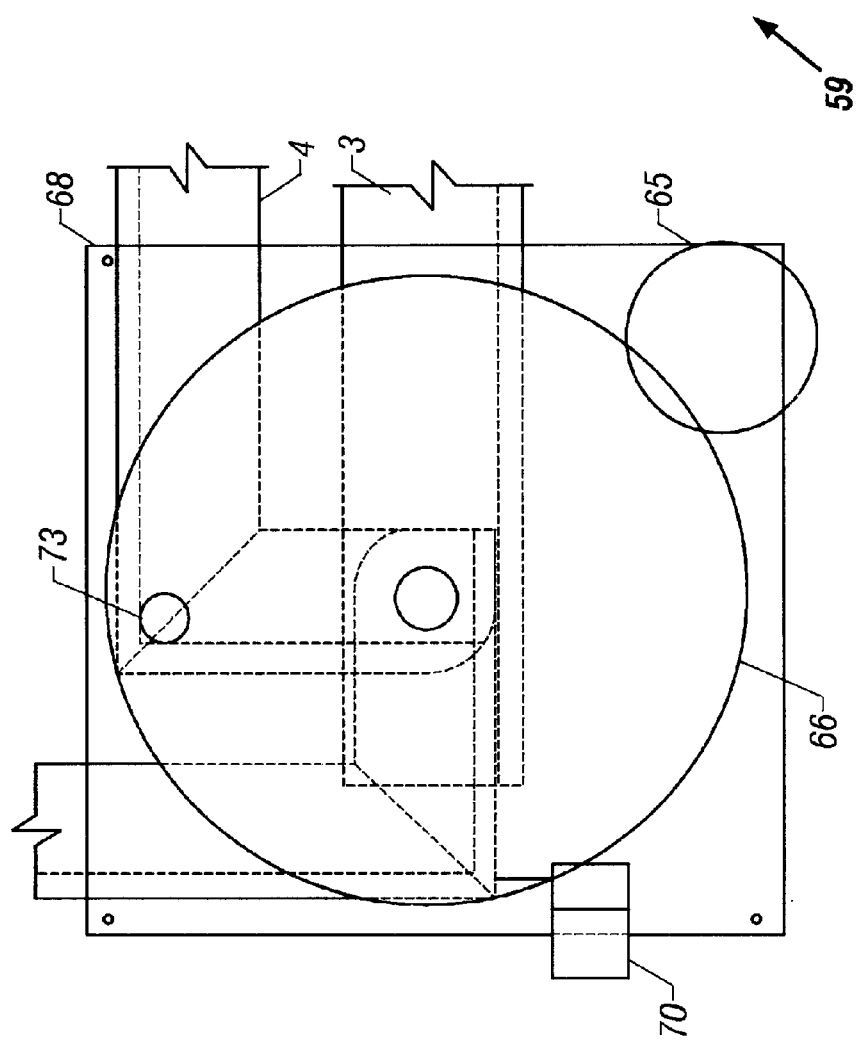
FIG. 12A is a side view of an embodiment of a collapse/extend device having a spur gear driven by a drive gear and motor.

Referring to FIGS. 12A and 12B, side and end views of an alternative embodiment of the collapse/extend device 59 are shown. In this embodiment, a spur gear 66 is attached to the collapsible post near the pivotal joint 6. The spur gear 66 is made to rotate with the collapsible post 4 around the pivotal joint 6 and rides on the hinge shaft 23. The teeth of the spur gear 66 are engaged by a drive gear 65. The drive gear 65 is powered by motor 69. Any type of motor or linkage may be used to power the drive gear 65. As the drive gear 65 turns, the spur gear 66 is driven to rotate the spur gear 66 around the hinge shaft 23. The spur gear 66 is anchored to the collapsible post 4 by anchor pin 73. Of course, a similar spur gear 66 and drive gear 65 (not shown) are used on the other pivotal joint 6 and collapsible post 4 located at the opposite end of the base rail 3. Depending on the particular embodiment of the invention, a single motor may be used to power both the drive gears 65 or independent motors may be used to power the drive gears 65 separately. While it may be placed anywhere in the system, a switch control 70 for the motor 69 is shown attached to the support plate 68. In particular, the switch control 70 may be a 3-P on/off key placed in the body side.

Opposite the spur gear 66, a support plate 68 is positioned which serves as the foundation for the cargo rack in the truck body 1. While only one support plate is shown in FIG. 12A and 12B, two support plates 68 are described with further reference to FIG. 13. The support plates 68 are attached to an inside of a truck body side 2 below the truck body side top surface 10. The base rail 3 is attached at the ends to the support plates 68. The hinge shafts 23 extend through the spur gears 66, the base rail 3, the collapsible post 4 and the support plate 68. The hinge shafts 23 comprise shaft support flanges 91 and shaft retainers 90 to hold the pivotal joints 6 together similar to the embodiment described above. This configuration strengthens the pivotal joints 6 so that cargo rack is more rigid when in the support position.

Figure 13:
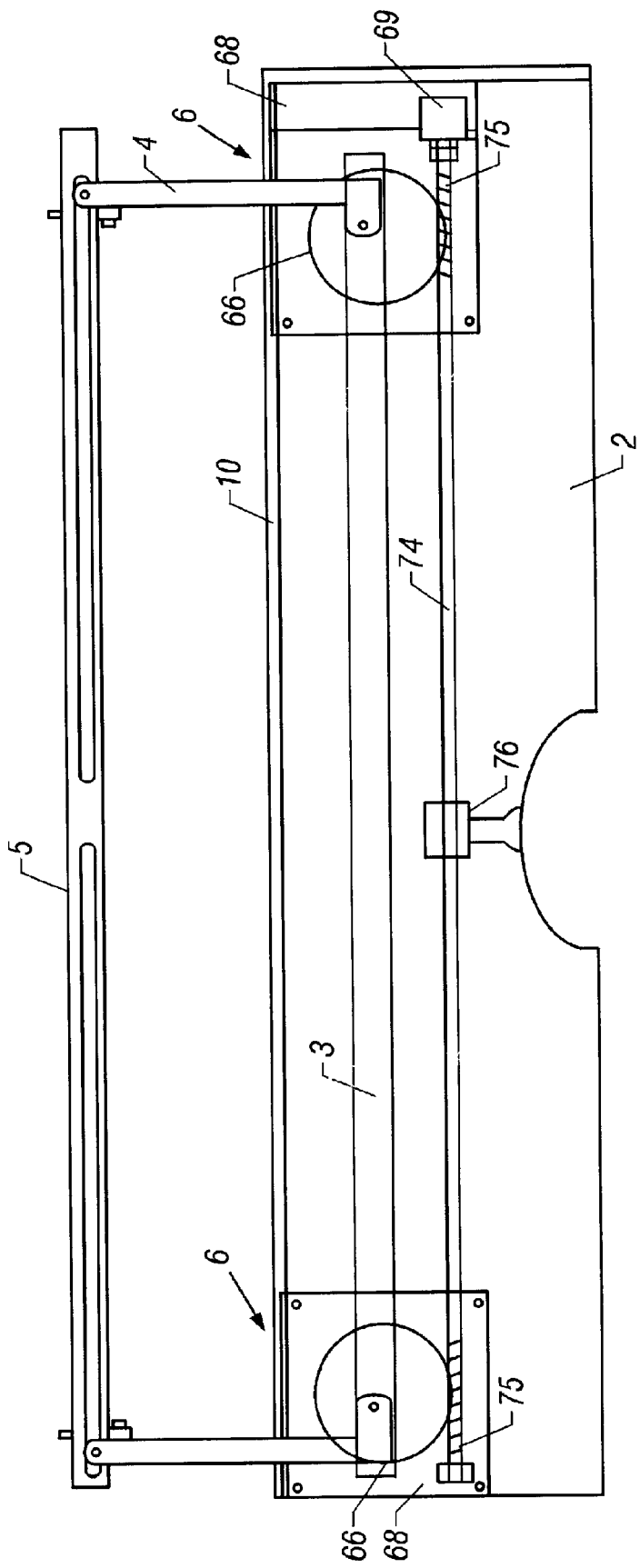
FIG. 13 is a side view of an embodiment of a collapse/extend device having spur gears driven by worm gears on a single drive shaft.

In the embodiment shown in FIG. 13, a drive shaft 74 with worm gears 75 is used to drive the spur gears 66. The threads of the worm gears are opposite so that as the drive shaft 75 turns, the worm gears 75 drive the spur gears 66 in opposite directions. The motor 69 is attached at one end of the drive shaft 74 to power the system. The drive shaft is supported in a central location by drive bearing 76.

Figure 14:
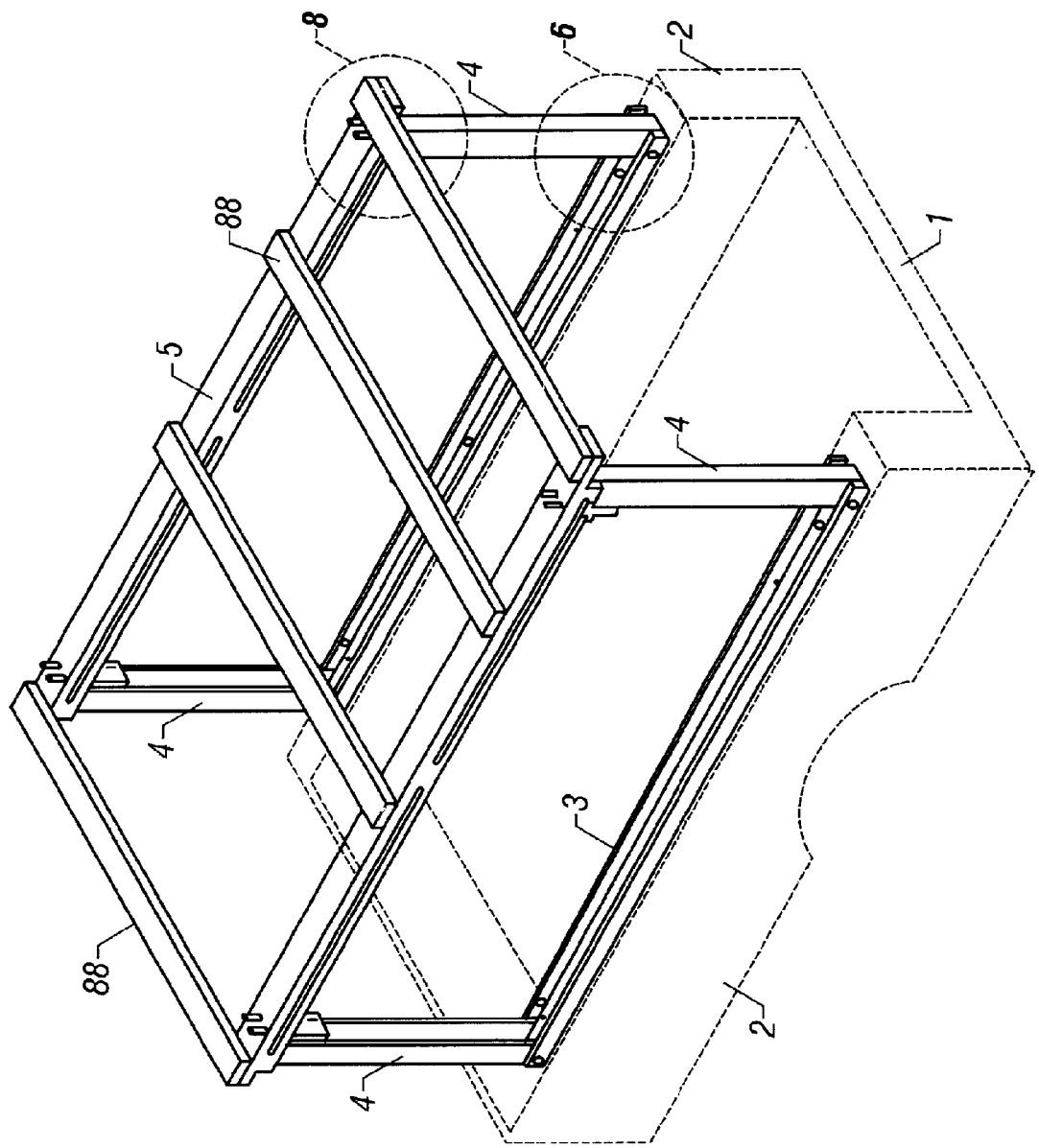
FIG. 14 is a perspective view of a cargo rack of the present invention having cross beams attached to the support rails on either side of the truck body.

Referring to FIG. 14, an embodiment of the invention comprising cross beams 88 is shown. The cross beams 88 are attached to the top sides of the support rails 5 and extend from one side of the truck body 1 to the other. While the cross beams 88 are attached by any means known to persons of skill in the art, it is particularly advantageous to attach them to the top surface of the support rails 5. In particular, the cross beams 88 are attached to the support rails 5 by bolts and wing nuts. In some embodiments, the cross beams 88 are telescoping to accommodate the width difference of the truck bodies and installation location of the cargo racks. This allows the slide joints 8 to slide through the carrier slots 7 in the support rail 5. Depending on the particular application, any number of cross beams 88 may be employed. For 4–6 foot racks, three cross beams 88 are sufficient. For 8 foot racks, four cross beams 88 are optimal. The cross beams 88 are attached to the support. The cross beams 88 are particularly useful in securing tall cargo to the cargo rack. Further, the cross beams 88 may be moved and reattached to the support rails 5 while cargo is loaded and unloaded. Thus, the cross beams 88 may be used to tailor the cargo rack to the configuration of each item of cargo. The cross beams 88 may be removed from or remain attached to the support rails 5 in all positions of the cargo rack. In an alternative embodiment, additional cross beams 88 are attached to the base rails to provide additional cargo support.

Figure 15A:
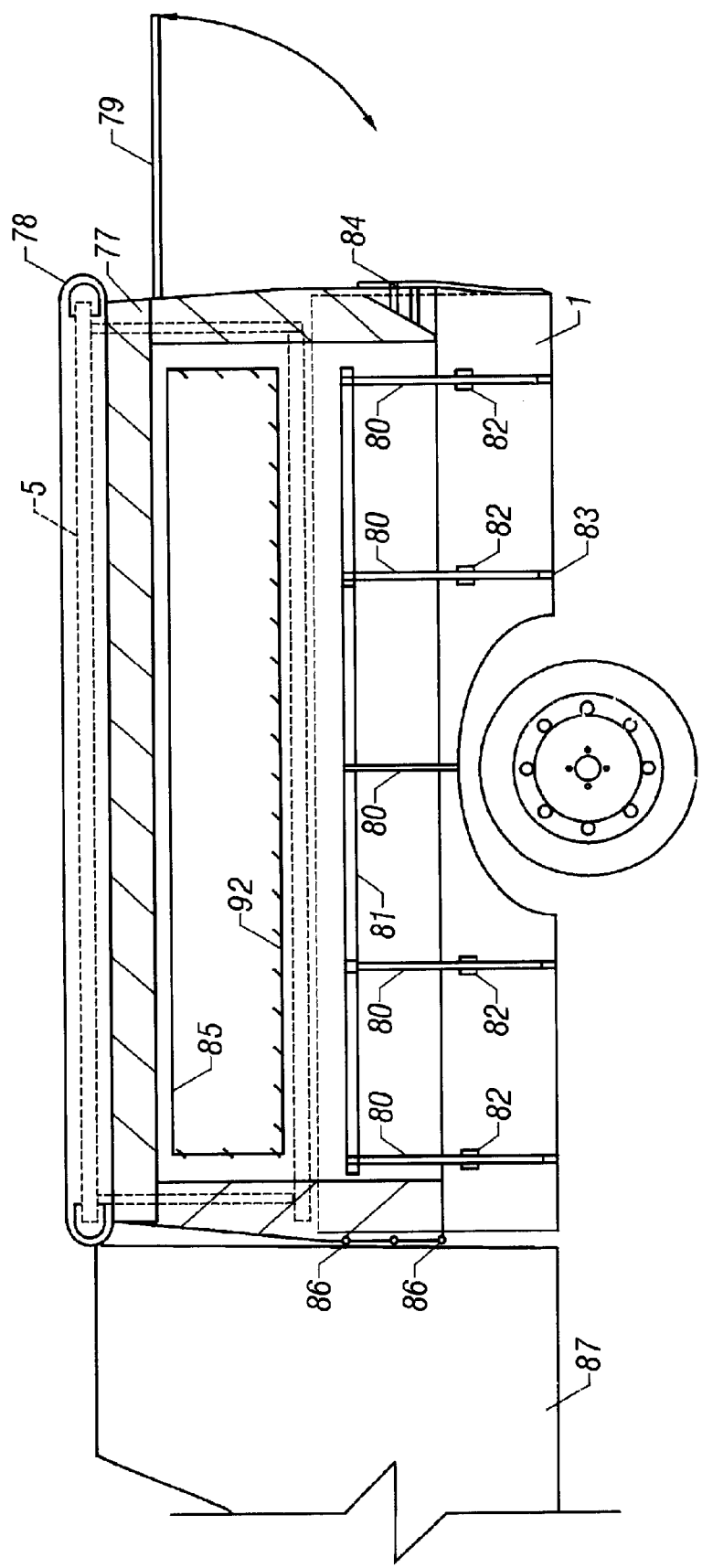
FIG. 15A is a side view of an embodiment of the invention having a raincoat draped over the cargo rack.
Figure 15B:
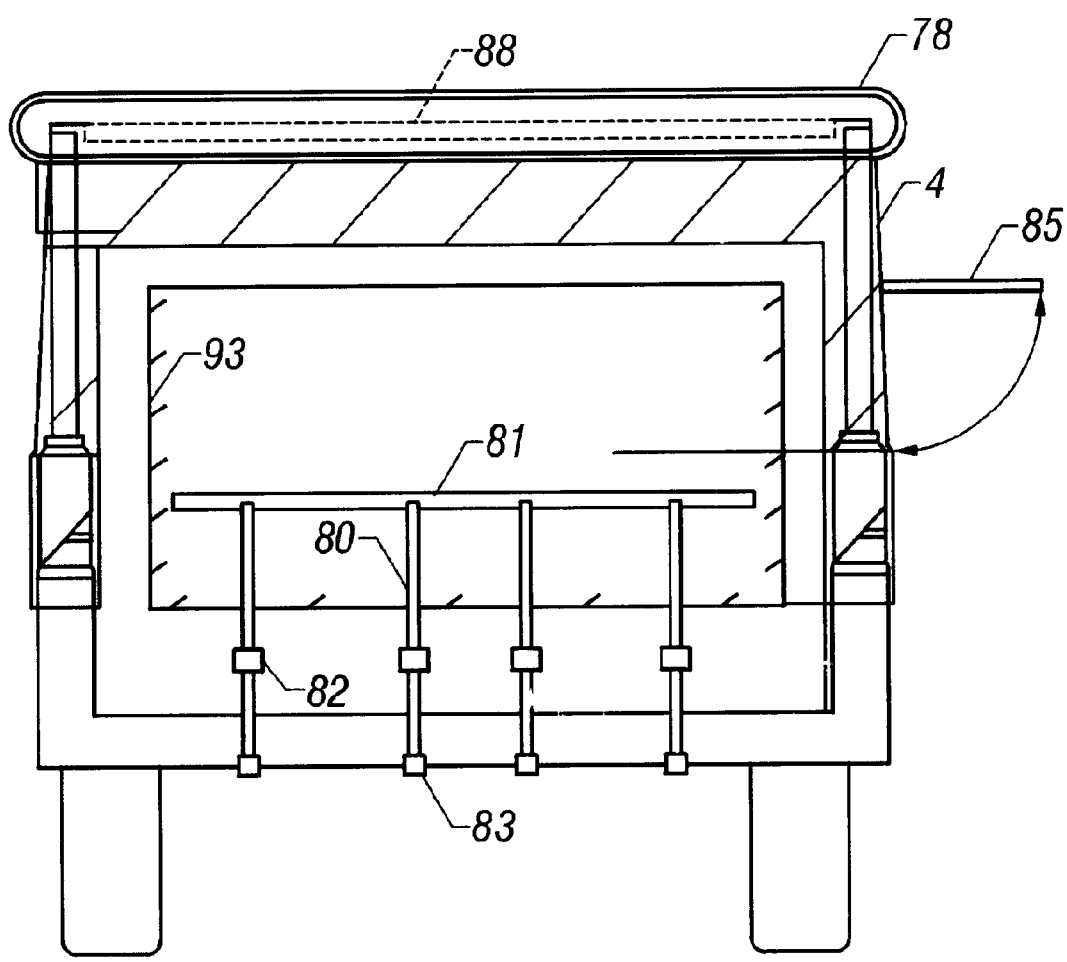
FIG. 15B is an end view of the raincoat embodiment of the invention shown in FIG. 15A.

Referring to FIGS. 15A and 15B, side and end views of a collapsible raincoat embodiment of the invention are shown. In this embodiment of the invention, the cargo rack which is made up of two side cargo racks previously described, serve as a frame for a raincoat 77. Anti-rubbing bars 78 are attached to the support rails 5 to reduce wear on the raincoat 77 ends and corners during transit. The anti-rubbing bars 78 fit the end of the upper ends of the support rails and strengthen the support rails 5 to resist wind or centrifugal forces created during transit. The cargo rack is also equipped with cross beams 88, as noted above, which are also fitted with anti-rubbing bars 78. The raincoat 77 drapes over the anti-rubbing bars 78. In FIG. 14A, a rear flap 79 is shown in an opened position. This enables access to the interior for loading or unloading cargo. With pole supports (not shown) at either end, the rear flap could be used as a camper awning. Tie down straps 80 are attached to a stiffener 81. The stiffener 81 is sewn into the raincoat 77 to spread the tie-down strap affects over a wider area to prevent the raincoat from ripping. The tie down straps 80 are secured with strap tension locks 82. The loose ends of the tie down straps 80 are secured to the truck body 1 with rings 83. The straps 80 are plastic and the rings 83 are plastic coated "S" clips to secure the raincoat 77 to the lower surfaces of the truck body 1. Stretch straps 84 secure the raincoat 77 over corner tail lights without obscuring their illumination or signals. Side flaps 85 are sewn in both sides of the raincoat 77. Zipper closures are used for the side and rear flaps 85 and 79. Ballast pockets 86 are sewn into the raincoat 77 between the truck body 1 and a cab 87 to hold the raincoat 77 in place. As wind blows between the cab 87 and the truck body 1, the ballast pockets 86 prevent the raincoat 77 from being blown out.

The raincoat material is rain resistant 20% stretch material. This material is sometimes referred to as parachute material. Rain resistant zippers on the side and end access flaps have a soft material liner for the lower section that is in contact with the truck body, to eliminate scratching.

Figure 16B:
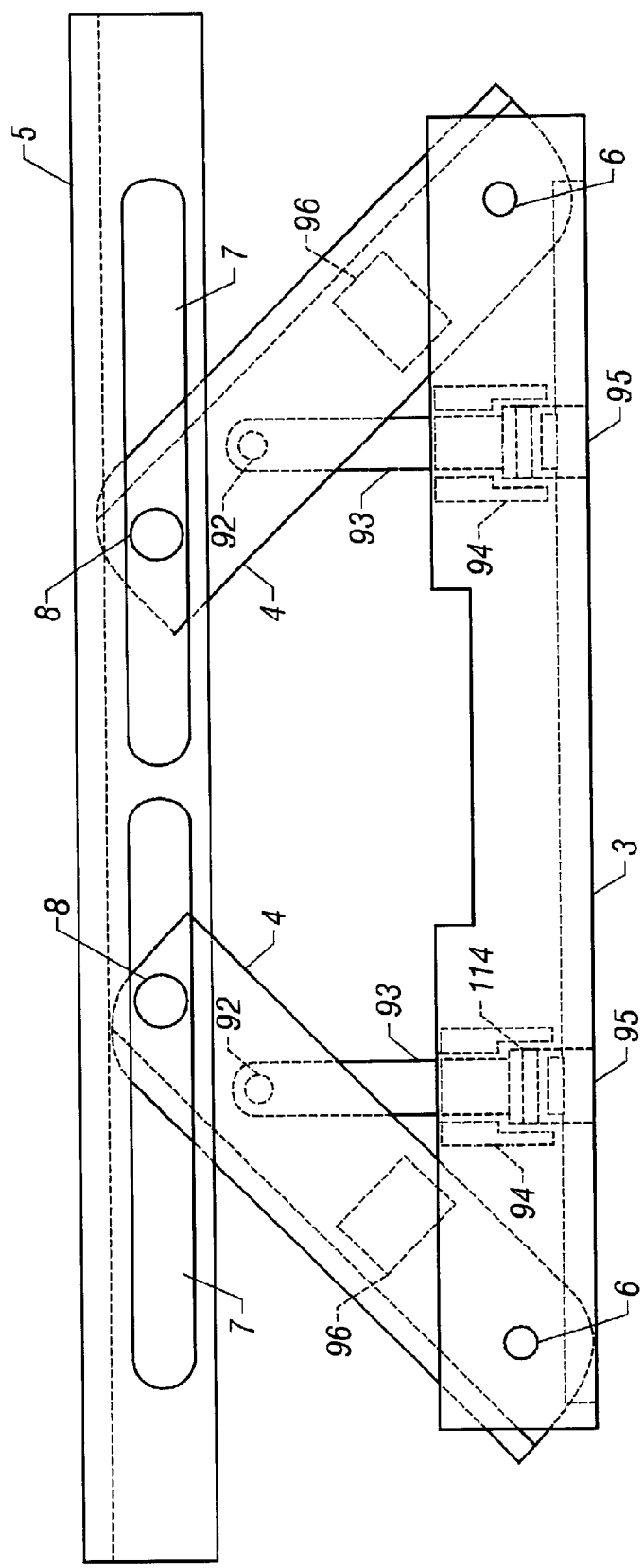
FIG. 16B is a side view of an embodiment of the invention having swivel lock shafts for locking the rack in a partially extended, horizontal position.

Referring to FIGS. 16A–16B, a further aspect of the invention comprises a swivel lock shaft 93 for locking the collapsible post in a partially deployed position. As shown in FIG. 16A, each of the swivel lock shafts 93 is attached to a collapsible post 4 by a swivel lock pin 92. When not in use, the swivel lock shaft 93 is temporarily fixed to the collapsible post by storage clamp 96.

Figure 16C:
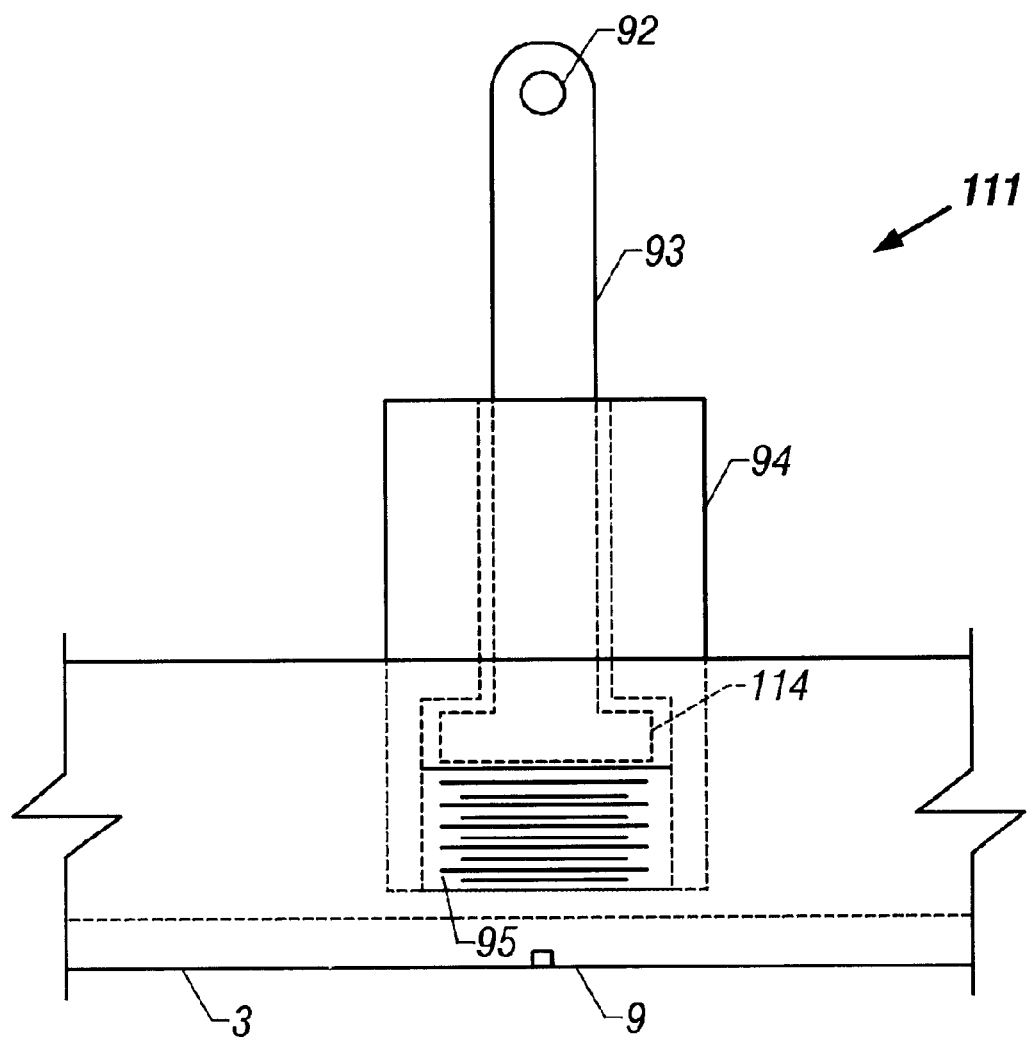
FIG. 16C is a side view of a swivel lock shaft for securing a collapsible post in a partially extended position.

To deploy either end of the carrier, use the handle 50 at the selected end and raise the support rail 5 at that end until the swivel lock assembly can be freed from the swivel spring steel storage clamp 96 located between the legs of the collapsible post 4 until the lock hex nut 94 may be lowered onto the threaded post 95. The swivel lock shaft 93 is released from the storage clamp 96 and rotated about the lock pin 92 so that the swivel lock shaft 93 is vertically positioned over a threaded post 95. The threaded post 95 is attached to the base rail 3. As shown in FIG. 16C, the swivel lock shaft 93 comprises a flange 114 at the distal end. A lock hex nut 94 is positioned around the swivel lock shaft 93. The lock hex nut 94 has an inside diameter slightly greater than the outside diameter of the swivel lock shaft 93. A second portion of the lock hex nut 94 has an inside diameter slightly greater than the outside diameter of the flange 114. This second portion is also threaded for engaging the threaded post 95. The swivel lock shaft 93 is attached to the threaded post 95 by positioning the swivel lock shaft 93 directly over the threaded post 95. The lock hex nut 94 is then slid across the length of the shaft 93 toward the flange 114 which rests on top of the threaded post 95. The lock hex nut 94 is then rotated to engage its threads with those of the threaded post 95 until the lock contacts the top of the threaded post 95 to form rigid connection that will withstand pressures during transit. Once the lock hex nut 94 is firmly screwed to the threaded post 95, the flange 114 and lock shaft 93 are firmly held in place.

In alternative embodiments, one or more of the collapsible posts 4 comprise swivel lock shafts 93. In some of these embodiments, it is necessary to lock only one or more of the collapsible post 4 in a partially deployed position. If the particular embodiment does not require a collapsible post 4 to be locked in a partially deployed position, the swivel lock shaft 93 is not necessary. If you want both ends to be located at this lowered position, follow the same procedure at the other end. Deploy one end of the rack as described for 16A. Raise the other end and follow the same procedure to complete the deployment.

Figure 17A:
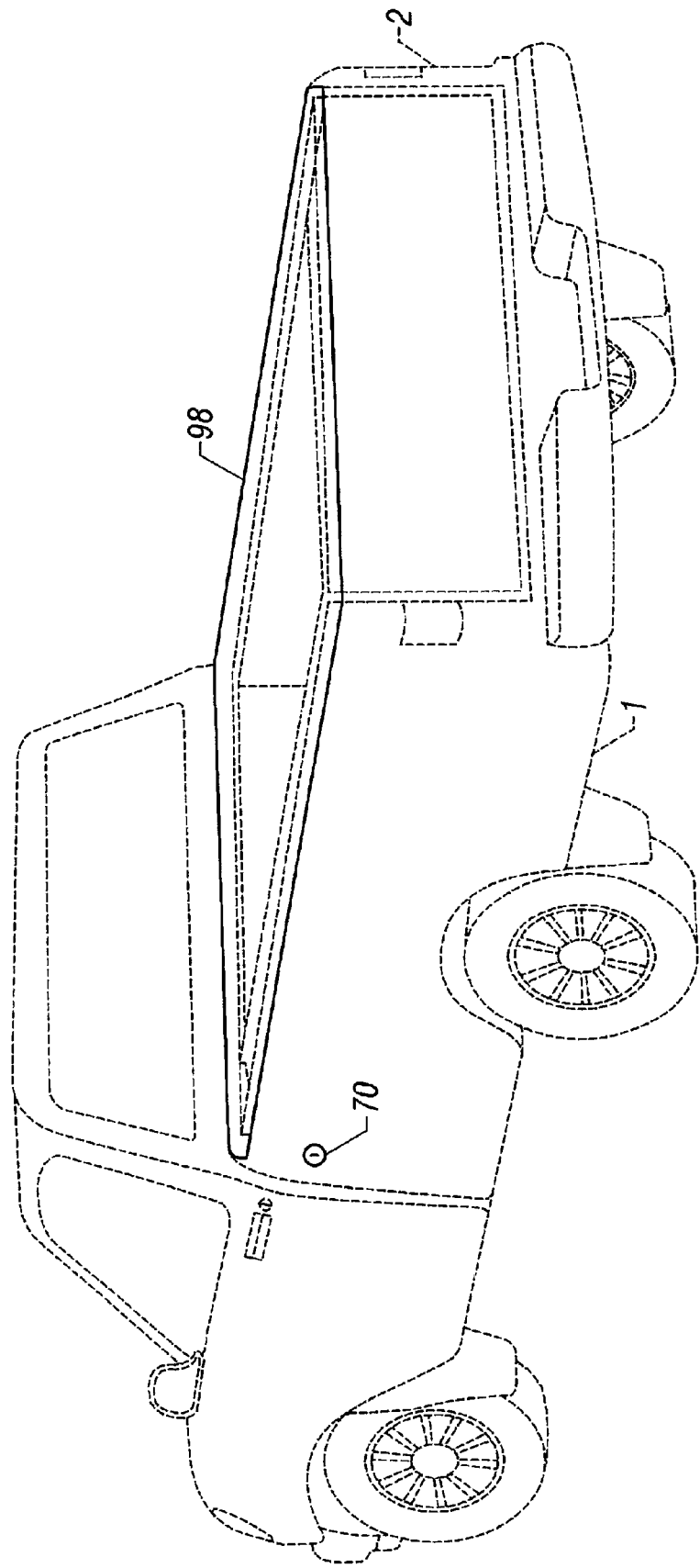
FIG. 17A is a perspective view of a truck body having a body cover in a collapsed position.
Figure 17B:
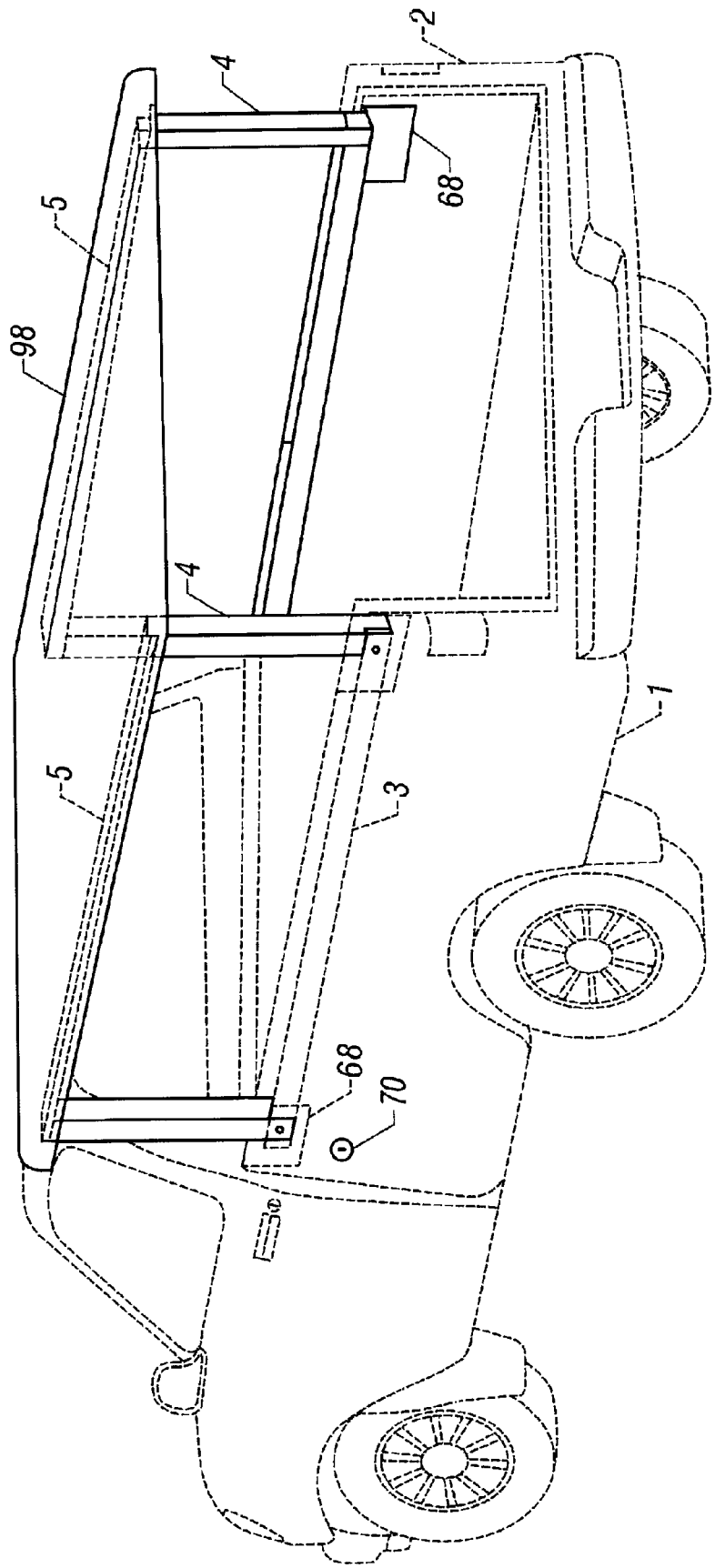
FIG. 17B is a perspective view of a truck body having a body cover in an extended position.

Referring to FIGS. 17A and 17B, a body cover embodiment of the invention is illustrated. The body cover 98 is a substantially flat structure which extends across the entire truck body 1. The body cover 98 is attached to the support rails 5 of the above described cargo rack. Thus, when the support rails are collapsed to a collapsed position, the body cover 98 rests firmly on the truck body sides 2 to securely enclose the interior of the truck body 1. The body cover 98 is raised to expose the interior of the truck body 1 by extending the collapsible posts 4 to extended positions. A switch control 70 for the collapse/extend device (not shown) is located in the exterior of the truck body side 2. This location allows easy access by the operator to open and close the body cover 98 with a key access.

Depending on the particular embodiment, the body cover 98 comprises metal, plastic or fiberglass or any other material known to those of skill in the art. As described above, if it is only necessary for the operator to obtain access to the front or back of the truck body 1, only one side of the truck body cover may be elevated to provide the necessary access. For example, if the rear of the truck body cover 98 is to be lifted, the collapsible post 4 at the rear of the truck body 1 may be extended while the collapsible post 4 at the front of the truck body 1 remain collapsed. The particular mechanisms for performing these functions are those previously described.

The cover 98 may be attached to support rails 5 and or cross beams 88 with screws, bolts or other attachment methods known to persons of skill in the art. The top 98 fits snugly over the truck body surface 10, front sides and the upper surface of the tailgate, when closed, to provide a waterproof seal and a secure compartment for stored material during transit and for burglar resistant storage when parked. A low durometer (sponge rubber) material is affixed to the top 98 to match and contact the truck body surfaces 10 to provide a water tight seal in the closed position.

Referring to FIG. 18, a cargo stabilizer 115 is illustrated. The purpose of the cargo stabilizer 115 is to secure cargo to either the base rail 3 or support rail 5 of the cargo rack previously described. In modern truck bodies 1, a wheel housing 113 is positioned in the interior of a truck body 1. These wheel housings 113 prevent cargo from being positioned directly adjacent to the truck body side 2. The cargo stabilizer assembly is designed to compensate for the intrusion of wheel housings into the cargo area of the pickup truck body. The wheel housings vary in size from manufacturer to manufacturer and the different models produced by the same manufacturer. The cargo stabilizer 115 acts as a spacer and stabilizer between the base rail 3 and a point at which the wheel housing 113 extends into the truck body 1. For tall items of cargo, it is therefore necessary to secure upper portions of the cargo to the base rail 3 and support rail 5. However, the distance between the cargo (not shown) and the base rail 3 is defined by the wheel housing 113. To overcome this problem, the cargo stabilizer 115 is positioned between the cargo (not shown) and the base rail 3.

In an illustrative embodiment, the cargo stabilizer 115 comprises a cargo stabilizer shaft 101 which is attached to a stabilizer post 100. The stabilizer post 100 is fixed to the base rail 3. Extension holes 104 are drilled in the stabilizer shaft 101 for receiving the stabilizer post 100. Once the stabilizer post 100 is inserted into the extension holes 100, a wing nut 99 is screwed onto the stabilizer post 100 to secure the stabilizer shaft 101. At the distal end of the cargo stabilizer shaft 101, there is a swivel pin hole 111. A buttress support bar 105 comprises a buttress swivel pin hole 107 having approximately the same diameter as that of the swivel pin hole 111. The buttress support bar 105 is attached to the distal end of the cargo stabilizer shaft 101 by aligning the buttress swivel pin hole 107 with the shaft swivel pin hole 111 and inserting swivel pin 102. With the swivel pin 102 pushed through the holes, a swivel pin snap ring 103 is secured to the swivel pin 102 to lock it in place. Opposite the cargo stabilizer shaft 101, a buttress 106 is attached to the buttress support bar 105. Connecting holes 109 and 108 are drilled in the buttress 106 and buttress support bar 105, respectively. With the holes aligned, buttress attaching bolts 110 are inserted through the holes to securely attach the buttress 106 to the buttress support bar 105.

In a particular embodiment, the extension shaft 101, a square tube slightly smaller than the slot in the base rail 3 is placed on the threaded stabilizer post 100 and secured with the wing nut 99. The extension shaft 101 has multiple aligned holes drilled through both sides of the extension shaft 101 so the stabilizer may be adjusted to match the width of the wheel housing so as to permit vertical cargo loading. By virtue of the fact that the extension shaft 101 is drilled through both planes of the square tube it may be rotated 90 degrees to support different cargo shapes and sizes. The extension shaft 101 is inserted between the legs of the buttress support bar 105 and secured by inserting the lock pin 102 through the swivel pin hole 107 and the matching extension shaft pin hole in the extension shaft 101 and secured with the snap ring 103. The buttress 106 is attached to the buttress support bar 105 with the threaded bolts 110. The buttress size may be adjusted (increased or decreased) for specific cargo. Those skilled in the art would use various covers such as rubber, carpet, etc. for the buttress 106.

While the particular embodiments for pick-up truck racks as herein shown and disclosed in detail are fully capable of obtaining the objects and advantages hereinbefore stated, it is to be understood that they are merely illustrative of the preferred embodiments of the invention and that no limitations are intended by the details of construction or design herein shown other than as described in the appended claims.

LIST OF DESIGNATIONS

1. Truck Body
2. Truck Body Side
3. Base Rail
4. Collapsible Post
5. Support Rail
6. Pivotal Joint
7. Carrier Slots
8. Slide Joint
9. Arrows
10. Truck Body Surface
11. Support Bars
12. Leveling Screws
13. Anchor Bolts and Nuts
14. Tie Down Bolts
15. Lock Mechanism
16. Lock Holes
17. Base Rail Bottom
18. Base Rail Side
19. Axle Shaft Bore
20. Support Sides
21. Transverse Support Portion
22. Anchor Hole
23. Hinge Shaft
24. Hinge Bearings
25. Ring Groove
26. Snap Ring
27. Hinge Bearing Spacer
28. Set Screws
29. Set Screw Hole
30. Base Hinge Stop
31. Vertical Hinge Stop
32. Buttress Slots
33. Bearing Retainer
34. Joint Bearings
35. Support Rail Side
36. Support Rail Top
37. Joint Shaft
38. Handle
39. Hinge Pin
40. Lock Body
41. Lock Body Screws
42. Lock Body Holes
43. Threaded Holes
44. Shafts
45. Bottom
46. Top
47. Shaft Flange
48. Slots
49. Slide Plate
50. Lock Handle
51. Lock Rods
52. Cone-Shaped End
53. Spring Slide Portion
54. Spring Flange
55. Bias Spring
56. Spring Pin
56. Slide Screws
58. Lock Holes
59. Collapse/Extend Device
60. Drive Wheel
61. Lever
62. Tension Lines
63. Piston
64. Pump
65. Drive Gear
66. Spur Gear
67. Angle frame
68. Support Plate
69. Motor
70. Switch Control
71. Post Offset
72. Truck Body Front
73. Anchor Pin
74. Drive Shaft
75. Worm Gear
76. Drive Bearing
77. Rain Coat
78. Anti-Rubbing Bars
79. Rear Flap
80. Tie Down Straps
81. Stiffener
82. Strap Tension Locks
83. Rings
84. Stretch Straps
85. Side Flaps
86. Ballast Pockets
87. Cab
88. Cross Beams
90. Shaft Retainer
91. Shaft Support Flange
92. Lock Pin
93. Swivel Lock Shaft
94. Lock Hex Nut
95. Threaded Post
96. Storage Clamp
97. Rail Edges 98. Body Cover
99. WingNut
100. StabilizerPost
101. Cargo Stabilier Shaf
102. Stabilizer Swivel Pin
103. Swivel Pin Snap Ring
104. Extension Holes
105. Buttress Support Bar
106. Buttress
107. Buttress Swivel Pin Hole
108. Support Bar Connecting Holes
109. Buttress Connecting Holes
110. Attaching Bolts
111. Shaf Swivel Pin Ilole
113. Wheel Housing
114. Flange
115. Cargo Stabilizer

What is claimed is:

1. A rack for securing cargo to a vehicle comprising:
    a first base rail comprising first and second base braces attached to the vehicle;
    a first collapsible post having a first hinge end and a first slide end, wherein the first hinge end is rotably attached to said first base brace by a first hinge joint;
    a second collapsible post having a second hinge end and a second slide end, wherein the second hinge end rotatably attached to the second base brace by the second hinge joint; and
    a first support rail connected to the first slide end of said first collapsible post by the first slide joint and to the second slide end of said second collapsible post by the second slide joint, whereby rotation of said first collapsible post about the first hinge joint and the second collapsible post about the second hinge joint moves the first support rail between support and collapse positions.

2. A rack as claimed in claim 1, wherein said first collapsible post comprises a post offset which connects the first collapsible post to the first hinge joint.

3. A rack as claimed in claim 1, further comprising a first locking mechanism of the first slide joint.

4. A rack as claimed in claim 1, further comprising a collapse/extend device of said first collapsible post.

5. A rack as in claim 1, further comprising:
    a third base brace attached to the vehicle;
    a third collapsible post having a third hinge end and a third slide end, wherein the third hinge end is rotatably attached to said third base brace by a third hinge joint; and
    a second support rail connected to the third slide end of said third collapsible post by a third slide joint, whereby rotation of said third collapsible post about the third hinge joint moves the third support rail between support and collapse positions.

6. A rack as claimed in claim 5, further comprising a fourth collapsible post having a fourth hinge end and a fourth slide end, wherein the fourth hinge end is rotatably attached to a fourth base brace by a fourth hinge joint and the fourth slide end is slidably attached to the second support rail.

7. A rack as claimed in claim 6, further comprising a second base rail attached to the vehicle, wherein the second base rail comprises the third and fourth base braces.

8. A rack as claimed in claim 5, further comprising at least one cross beam which is attached to and extends between said first and second support rails.

9. A rack as claimed in claim 1, further comprising a raincoat attached to said first support rail, wherein said raincoat covers at least a portion of the vehicle.

10. A rack as claimed in claim 1, further comprising a body cover attached to the first support rail.

11. A rack as claimed in claim 1, further comprising a cargo stabilizer which is attached to the rack and extends toward an interior portion of the vehicle.

12. A rack for securing cargo to a vehicle, the rack comprising:
    first and second base rails attached to the vehicle;
    first and second collapsible post having first and second hinge ends and first and second slide ends, wherein the first and second hinge ends are rotatably attached to said first base rail by first and second hinge joints, respectively;
    a first support rail slidably connected to the first and second slide ends of said first and second collapsible posts by first and second slide joints, respectively, whereby rotation of said first and second collapsible posts about the first and second hinge joints moves the first support rail between support and collapse positions;
    third and fourth collapsible post having third and fourth hinge ends and third and fourth slide ends, wherein the third and fourth hinge ends are rotatably attached to said second base rail by third and fourth hinge joints, respectively;
    a second support rail slidably connected to the third and fourth slide ends of said third and fourth collapsible posts by third and fourth slide joints, respectively, whereby rotation of said third and fourth collapsible posts about the third and fourth hinge joints moves the second support rail between support and collapse positions.

13. A rack as claimed in claim 12, further comprising at least one cross beam which is attached to and extends between said first and second support rails.

14. A rack as claimed in claim 12, further comprising a raincoat attached to at least said first support rail, wherein said raincoat covers at least a portion of the vehicle.

15. A rack as claimed in claim 12, wherein said first collapsible post comprises a post offset which connects the first collapsible post to the first hinge joint.

16. A rack as claimed in claim 12, further comprising a first locking mechanism of the first slide joint.

17. A rack as claimed in claim 12, further comprising a collapse/extend device of said first collapsible post.

18. A rack as claimed in claim 12, further comprising a body cover attached to the first support rail.

19. A rack as claimed in claim 12, further comprising a cargo stabilizer which is attached to the rack and extends toward an interior portion of the vehicle.

20. A method for erecting a cargo rack mounted in a vehicle from a first, collapsed position to a second, cargo carrying support position comprising:
    rotating a first collapsible post having a first hinge end and a first slide end about a first hinge joint between a first base brace and the first hinge end of the first collapsible post, the first brace being mounted to the vehicle;
    rotating a second collapsible post having a second hinge end and a second slide end about a second hinge joint between a second base brace and the second hinge end of the second collapsible post, the second brace being mounted to the vehicle;

sliding the first slide end of the first collapsible post relative to a support rail through the first slide joint;

sliding the second slide end of the second collapsible relative to a support rail through the second slide joint; and locking the first and second slide joints in place relative to the support rail.

21. A rack as claimed in claim 1 further comprising a stop for limiting rotation of said first collapsible post.

22. A method as claimed in claim 20 further comprising limiting the rotation of the first collapsible post.

* * * * *